US008977722B2

(12) United States Patent
Tsao

(10) Patent No.: US 8,977,722 B2
(45) Date of Patent: *Mar. 10, 2015

(54) METHOD AND APPARATUS FOR INFORMATION EXCHANGE OVER A WEB BASED ENVIRONMENT

(75) Inventor: Sheng Tai (Ted) Tsao, San Jose, CA (US)

(73) Assignee: Sheng Tai (Ted) Tsao, Fremont, CA (US)

( * ) Notice: Subject to any disclaimer, the term of this patent is extended or adjusted under 35 U.S.C. 154(b) by 452 days.

This patent is subject to a terminal disclaimer.

(21) Appl. No.: 13/468,716

(22) Filed: May 10, 2012

(65) Prior Publication Data

US 2012/0221957 A1 Aug. 30, 2012

Related U.S. Application Data

(60) Division of application No. 11/732,496, filed on Apr. 2, 2007, and a continuation-in-part of application No. 10/713,904, filed on Aug. 6, 2002, now Pat. No. 7,418,702, and a continuation-in-part of application No. 10/713,905, filed on Aug. 12, 2002, now Pat. No. 7,379,990.

(60) Provisional application No. 60/787,653, filed on Mar. 31, 2006.

(51) Int. Cl.
G06F 15/16 (2006.01)
H04L 12/24 (2006.01)
G06F 9/52 (2006.01)
G06F 9/54 (2006.01)
H04L 29/08 (2006.01)

(52) U.S. Cl.
CPC ................ *H04L 41/22* (2013.01); *G06F 9/526* (2013.01); *G06F 9/54* (2013.01); *H04L 41/0806* (2013.01); *H04L 41/0879* (2013.01); *H04L 41/5054* (2013.01); *H04L 67/02* (2013.01); *H04L 67/10* (2013.01); *H04L 41/0253* (2013.01); *G06F 2209/541* (2013.01)
USPC ............................ 709/219; 717/101; 717/173

(58) Field of Classification Search
USPC ........................................................ 709/219
See application file for complete search history.

(56) References Cited

U.S. PATENT DOCUMENTS

| 4,604,694 | A  | * | 8/1986  | Hough .......................... 710/200 |
| 2002/0129106 | A1 | * | 9/2002  | Gutfreund ...................... 709/205 |
| 2003/0097410 | A1 | * | 5/2003  | Atkins et al. ................... 709/206 |
| 2005/0097440 | A1 | * | 5/2005  | Lusk et al. ...................... 715/500.1 |
| 2005/0262006 | A1 | * | 11/2005 | Beartusk et al. ................. 705/37 |
| 2006/0095514 | A1 | * | 5/2006  | Wang et al. ..................... 709/204 |
| 2007/0255712 | A1 | * | 11/2007 | Mahoney et al. ................. 707/9 |

* cited by examiner

*Primary Examiner* — Tauqir Hussain

(57) ABSTRACT

Exchanging information via web is a way of life in modern society. Present invention utilizes dynamic workspace technology to allow people much efficiently and flexibly to exchanging information across global environment.

22 Claims, 18 Drawing Sheets an example of resource may be assigned to a user-group common work space.

Fig. 1: A Typical CCDSVM platform with Multiple Clients

Fig. 2A) A variation of the CCDSVM platform for web-browser based communication:

Fig. 2B: A variation of CCSDVM platform, the degenerated CCDSVM with only control system and without provisioned systems, and to be accessed by massive client systems. (The like elements has same reference number)

Fig. 3) The Software of WCUWE for typical CCDSVM:

Fig. 4A: Dynamic work space (central location for share) on Control system.

Fig. 4B: an example of resource may be assigned to a user-group common work space.

Fig. 4C: an example of user private work space.

Fig. 5: An example of resource objectives on systems and can be assigned to each group or each user' work space.

Fig. 6A: An example of displaying a web-page with 4 sections in web-browser of user X in user-group-1 during an interactive online meeting.

Fig. 6B: An example of displaying a web-page with 4 sections in web-browser of user Y in user-group-1 during interactive online meeting.

group-1 before interactive online meeting.

Fig. 6C: An example of display a web-page with 4 sections in browser of user X in user group-1 before interactive online meeting.
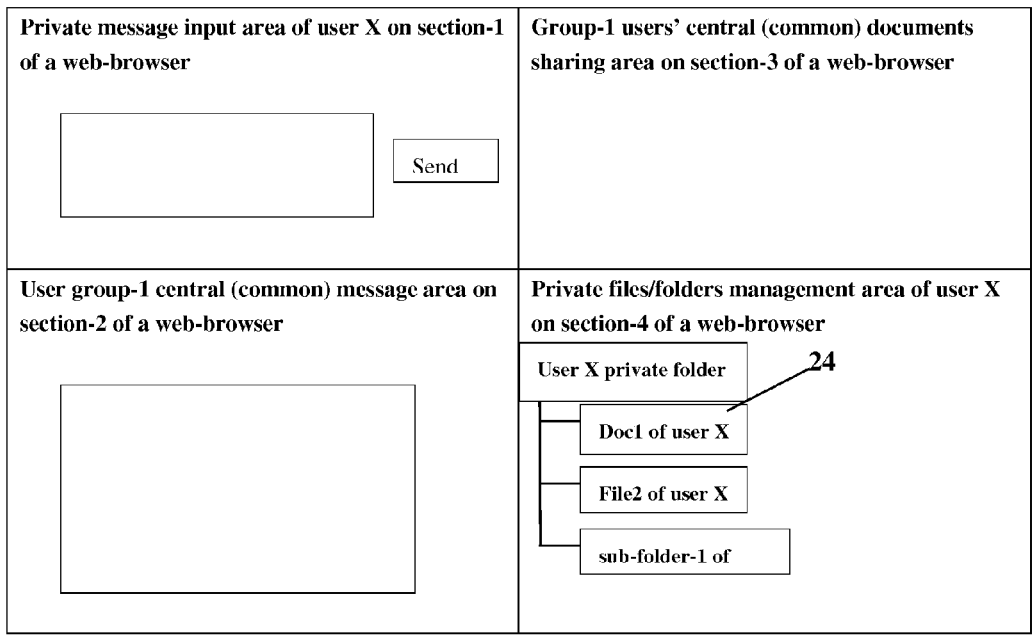
Fig. 6D: An example of display a web-page with 4 sections in browser of user Y in user group-1 before interactive online meeting.
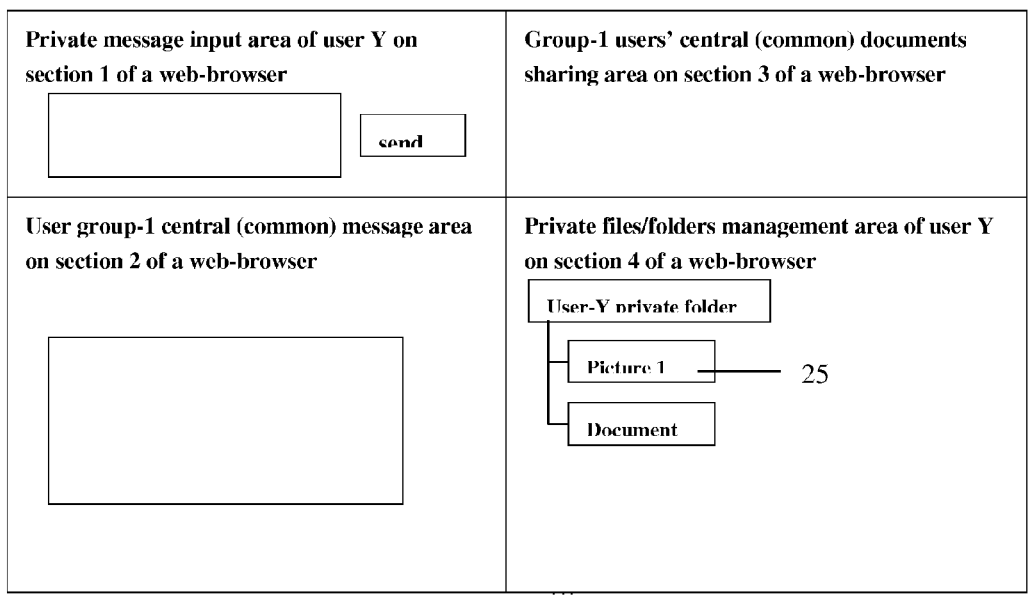

Fig. 6E: An example of displayed web-page that each massive online user can access and view from each of their browser without login to CCDSVM during said user X and user Y in user-group-1 online meeting.

Fig. 7A: Non-group based one-to-one peer-to-peer post messages and folders of user X

Fig. 7B: Non-group based one-to-one peer-to-peer post messages and folders of user Y Fig. 8A: An example web graphic presentation view of assigned resources in a user X's private work space.

Fig. 8B examples of web-based graphic presentation of assigned resource in the private work space of user Y.

Pop-up menu for folder

Fig. 8C: An example web graphic presentation view of user Y's private work space after user X dynamically posted and shared "folder 2" in user X's private space.

Fig. 9A: an example of pop-up menu for folder

| Add folder |
|---|
| Rename |
| Delete |
| Copy/Past |
| Move |
| Post/Share |
| Un-Post |
| Upload |
| Set Mode |

Fig. 9B an example of pop-up menu for file

| Rename |
|---|
| Delete |
| Copy/Past |
| Move |
| Post/Share |
| Un-Post |
| Upload |
| Set Mode |

Fig. 10A an example of non pop-up operation menu for folder:

| Add folder | Rename | Delete | Copy/past | Move | Post/share | Un-post | upload | Set mode |
|---|---|---|---|---|---|---|---|---|

Fig. 10B an example of non pop-up operation menu for folder:

| Rename | Delete | Copy/past | Move | Post/share | Un-post | Set mode |
|---|---|---|---|---|---|---|

Fig. 11: an example of center view of list of posted files or folders in file & folder area of a private work space of a user X in a special personal share management section of a web-page.

| File or Folder Name | On System | Share to Who | |
|---|---|---|---|
| My-video jpg file | System-1 | Jane | Delete shared? |
| Project plan | Engineer-3 | Jim | Delete shared? |
| C program code for web | Support-2 | John | Delete shared? |
| Picture of building | System-1 | Jane | Delete shared? |
| Engineer Drawing | Engineer-3 | Jim | Delete shared? |
| Patent application-v1 | System-1 | Ted | Delete shared? |
| Folder 2 | System 2 of system group-A | User Y | Delete shared? |
| | | | |
| | | | |
| | | | |
| | | | |

Fig. 11

METHOD AND APPARATUS FOR INFORMATION EXCHANGE OVER A WEB BASED ENVIRONMENT

PRIORITY

This application is a divisional application for U.S. patent application Ser. No. 11/732,496 filed on Apr. 2, 2007, which has claimed the benefit of priority based upon U.S. Provisional Patent Application Ser. No. 60/787,653, filed on Mar. 31, 2006, which in turn referenced provisional application 60/585,552. The application Ser. No. 11/732,496 is also a continuation-in-part of U.S. patent application Ser. No. 10/713,904, filed on Aug. 6, 2002," which is converted from the U.S. provisional application No. 60/401,238, and now is a U.S. Pat. No. 7,418,702. The application Ser. No. 11/732,496 is also a continuation-in-part of U.S. patent application Ser. No. 10/713,905, filed on Aug. 12, 2002, which is converted from the U.S. provisional application Ser. No. 60/402,626, now is a U.S. Pat. No. 7,373,990. The above mentioned prior applications are herein incorporated by reference for all purposes.

FIELD OF THE INVENTION

The present invention generally relates to communications network. More specifically, the present invention relates to web based communications system.

BACKGROUND OF THE INVENTION

With increasing popularity of using the Internet and World Wide Web ("the Web") for the rapidly changing digital world, individuals as well as enterprises, exchange (or swap) large volumes of information through the Web. The demand for larger and faster information exchange has increasingly grown in recent years. For example, various business meetings and conferences are conducted over the Web with attendees scattered around the world. To enhance the communication between the meeting attendees, not only voice (and/or image) information is important, but also information exchange can be critical.

Fast, volume, and secure information exchange is important in enhancing the efficiency of a communications network. A problem associated with a conventional network is limited size and speed. For example, a typical email system limits the size of each email, such as 10 megabytes, thereby a reasonable speed of delivery of such email can be achieved. Another problem associated with a conventional network is that various hosts require software installation before a user can use their platform. For example, Skype™ requires users to install its proprietary software on the user's systems before it allows them to use its platform.

Accordingly, there is a need in the art to provide a faster, more secure, volume information exchange over the Web.

SUMMARY OF THE INVENTION

The present invention relates to a method and apparatus for information exchange over a web environment.

With the development of central controlled distributed scalable virtual machine (CCDSVM) and the web-based computer user working (operating) environment (WCUWE) of present invention, the problems mentioned in the previous section can easily be solved by introducing "dynamic work space" technology of present invention within the frameworks of the CCDSVM and the WCUWE.

With the dynamic work space technology, one or more login users of the CCDSVM, each user via a browser on any computing system from anywhere can instantly perform tasks. For example, the user can post or un-post messages, files, folders, or other resources, resided on systems of the CCDSVM with group-based model or non-group based 1-to-1 model, to one or more audiences across a communication network. This technology will also achieve larger scales of secure information exchange without installation of special software.

The implementation of this invention has provided users with a web-browser based, 1-click system that is capable of securing exchanges of messages, files, folders, or other information resided on the systems crossing network domains without size limitation.

Additional features and benefits of the present invention will become apparent from the detailed description, figures, and claims set forth below.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 6C illustrates an example of displaying a web-page with 4 sections in a web-browser of a user X in the user group before the interactive online meeting in accordance with another embodiment of the present invention;

FIG. 6D illustrates an example of displaying a web-page with 4 sections in the web-browser of the user Y in the user group before the interactive online meeting in accordance with another embodiment of the present invention;

FIG. 9A is an example of a pop-up menu for folders in accordance with one embodiment of the present invention;

FIG. 9B is an example of a pop-up menu for files in accordance with another embodiment of the present invention;

FIG. 10A is an example of a non pop-up operation menu for folders in accordance with one embodiment of the present invention;

FIG. 10B is an example of a non pop-up operation menu for folder files in accordance with another embodiment of the present invention;

FIG. 11 is an example a list of posted files or folders in a file & folder area of a private work space of a user X in accordance with one embodiment of the present invention.

DETAILED DESCRIPTION

Figure 1:
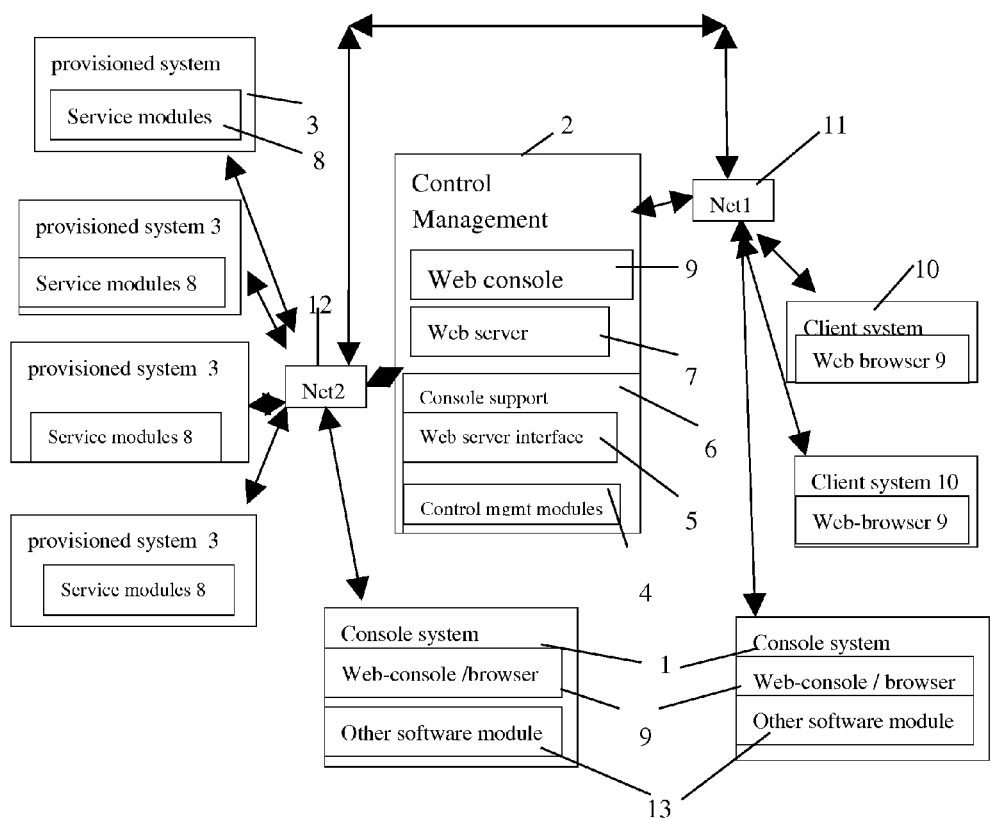
FIG. 1 is a block diagram illustrating a layout of a CCDSVM with a central control management system, multiple provisioned systems, client systems, and console systems in accordance with one embodiment of the present invention.

Embodiments of the present invention are described herein in the context of a method, system and apparatus for providing a web based communications network with fast, volume, and secure information exchange. Those of ordinary skill in the art will realize that the following detailed description of the present invention is illustrative only and is not intended to be in any way of limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with the present invention, the components, process steps, and/or data structures described herein may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. Where a method comprising a series of process steps is implemented by a computer or a machine and those process steps can be stored as a series of instructions readable by the machine, they may be stored on a tangible medium such as a computer memory device (e.g., ROM (Read Only Memory), PROM (Programmable Read Only Memory), EEPROM (Electrically Eraseable Programmable Read Only Memory), FLASH Memory, Jump Drive, and the like), magnetic storage medium (e.g., tape, magnetic disk drive, and the like), optical storage medium (e.g., CD-ROM, DVD-ROM, paper card and paper tape, and the like) and other known types of program memory.

Those of ordinary skill in the art will realize that the following detailed description of the present invention is illustrative only and is not intended to be in any way limiting. Other embodiments of the present invention will readily suggest themselves to such skilled persons having the benefit of this disclosure. It will be apparent to one skilled in the art that these specific details may not be required to practice to present invention. In other instances, well-known circuits and devices are shown in block diagram form to avoid obscuring the present invention. In the following description of the embodiments, substantially the same parts are denoted by the same reference numerals.

While particular embodiments of the present invention have been shown and described, it will now be apparent to those skilled in the art having the benefit of this disclosure that many more modifications than mentioned above are possible without departing from the inventive concepts disclosed herein. Therefore, the appended claims are intended to encompass within their scope all such modifications as are within the spirit and scope of this invention.

The present invention can be implemented by a web based system operated in a network infrastructure, such as a central controlled distributed scalable virtual machine ("CCDSVM") of present invention. FIG. 1 illustrates a CCDSVM in accordance with an embodiment of the present invention. A CCDSVM includes a group of provisioned systems 3, a control management system 2, console systems 1, and client systems 10. The control management system ("control system") 2 is configured to control a group of systems ("provisioned system") 3. The console systems ("console systems") 2 facilitates user to manage the CCDSVM via the control system while the client systems 10 ("client systems") is allowed from a web browser to initiate accessing the provisioned systems 3 via the control system over a network infrastructure, such as the Intranet, an Internet, and/or a LAN.

The discussion in following several paragraphs manifests limitation of present invention. The network infrastructure ("network") includes all necessary hardware and software that facilitate various users from different geographic locations to communicate through the Internet, an Intranet, and/or a LAN. The hardware of the network includes wired network connection media, wireless connecting media, circuitry components, and communication equipments. The network connection media includes various cables such as Ethernet and/or optical fiber. The wireless connecting media is capable of establishing wireless communication links through air. The circuitry components include processor, data bus, memory devices, and/or circuit board. The communication equipments, such as switches, routers, gateways, and/or adapters, are used to provide a communications network. It should be noted that there are other possible elements of communication equipment that may be needed to form a communication link, but they are not necessary to understand the present invention.

The software infrastructure includes Internet Protocol ("IP") addresses and system name identification software such as Domain Name System ("DNS") firewall software, IP gateway set-up software, IP broadcast, and so forth. The communication protocols over the network could be IP-based standard or non-standard proprietary protocols such as Hypertext Transfer Protocol ("HTTP") over Transmission Control Protocol/Internet Protocol ("TCP/ IP") or Simple Object Access Protocol ("SOAP") over TCP/IP. It should be further noted that some IP based protocols are proprietary protocols and some are non-IP based protocols.

A web-browser is an application program that allows a user to access information over the Web, such as Windows Internet Explorer ("IE"), FireFox, Netscape, and/or Mozillar. A web-browser could also be any proprietary software, which uses web-protocols such as HTTP, WAP, SOAP for communication over the network. The web-browser can be implemented with any suitable programming languages such as C, C++, Java, or XML, or a combination of the suitable languages.

A web page, on the other hand, is comprised of displayable resource information that is accessible through the web-browser. The web page may be hosted by a web server via a web server software and can be transmitted (or retrieved) by a web-browser on a computing device.

The provisioned systems 3, client systems 10, console systems 1, and control management system 2 illustrated such as in FIG. 1 are computing systems (devices) that could be a server system, desktop or laptop computer, handheld devices such as PDA, wireless phone, and so forth. Each computing system include CPUs, storage devices, and memory controller. The storage devices include internal memory such as read-only memory ("ROM") and/or random access memory ("RAM"). The storage devices may further include external storage devices such as magnetic disks or tapes, which include redundant array of redundant inexpensive disk drives ("RAID"), just bunch of disk drive ("JBOD"), and memory stick. The associated storage controller can be Integrated Drive Electronics ("IDE"), Small Computer System Interface ("SCSI"), Fiber optical controller, or a combination of above-mentioned devices.

The computing systems also include non-embedded or real-time embedded operating system ("OS"), which could be Linux, or Windows, Unix, or proprietary OS. It should be noted that the present invention may include multiple control systems at different layers of system configuration topology wherein each of the control systems is capable of communicating with each other through a network. The control systems at middle layers play dual roles as both control system and provisioned system in the system configuration topology.

FIG. 1 illustrates a CCDSVM platform with multiple clients 10 in accordance with one embodiment of the present invention. The CCDSVM includes the console systems 1, a control management system 2, the provisioned systems 3, and networks 11-12, wherein networks 11-12 are used inter-connecting with all systems of the CCDSVM and the client systems 10.

The console system 1 is a computing system having a web-browser or web-console 9 wherein the web-browser is used by privileged users for accessing the the CCDSVM platform. The web browser 9, which could be resided on any mentioned systems, permits a user to access information from the CCDSVM by following a web URL link. For example, a privileged user enters a URL of "https://69.107.28.123/stt/sttwebos" into an address input field of the web browser 9 and once the link is established, the user can obtain information hosted by the web-based computer user work/operation environment ("WCUWE") of the CCDSCM. The console system 1, in one embodiment, further includes software modules 13, wherein the software modules 13 may be used to facilitate communication between the console system 1 the and control management system 2.

The control system 2, in one embodiment, is a server system, a desktop or a laptop computer with the memory and storage capabilities. The control system 2 includes web server software 7 and console supporting software 6. The console supporting software 6 includes web server interface software modules 5 and control management software modules 4. The control management system 2 may also have a native web browser 9 used as a web-console 9 of the control system 2. The web server software 7 sends/receives data to/from the web-console 9 of the console system 1 or the client system 10 or the control system 2 itself. The web server software 7 is configured to provide secure sockets layer ("SSL") encryption to encrypting the data before transmission to enhance the security. The web server software 7 could be commercially available software such as Apache™ from open source, or IIS from Microsoft or a proprietary software. The web server software modules 7 and console support software modules 6 can be implemented by any suitable or a combination of any suitable programming languages such as C, C++, Java, JavaScript, HTML, or XML.

The console supporting software 6 communicates with the service software modules 8 of the provisioned systems 3. The web server interface 5 of the console support software 6 is capable of providing special functions that are otherwise performed by the web server 7. If there is no any provisioned systems 3 coupled to the CCDSVM platform, the control management system 2, in one embodiment, is reconfigured to continue monitoring systems over the network, and in other embodiment the CCDSVM platform becomes a single stand-alone system, as shown in FIG. 2B, therefore, users can access and/or obtain resources information of the control system 2 via the web-browser 9, which can be resided at on any client system 3 or console system 1.

The provisioned system 3 contains suitable operating system ("OS"). The provisioned systems 3 can be automatically provisioned by the control management system 2 through an automatic system service pool construction protocol. Provision process, also known as pooling process, is a method allowing the control system 2 to control one or more network systems by reconfiguring the network systems. For example, when a provisioned system boots up via a communication protocol, the control system 2 automatically obtains each provisioned system's name, IP address, and system information from the provisioned system, wherein the system information includes network information, storage information, file system information and so forth. Thus, each provisioned system 3 can be monitored, accessed, and/or operated by a user(s) through the web-browser 9 resided, for example, on the console system 1. In an alternative embodiment, provisional system 3 is controlled by users through client systems 10 via the control system 2 with proper user authentication. Each provisioned system 3 contains service software modules 8, which is used to communicate across over the Web. For example, the service software modules 8 of provisioned system 3 can communicate with the control management software modules 4 of the control management system 2 to carry out tasks for viewing or operating resources of provisioned system 3. The service software 8 can communicate with the web-browser 9 of the client system 10 or console system 1 to transfer data between them or deliver service to them, or to communicate with another provisioned system 3 to send or receive data.

The service software modules 8 may include special software modules having compatible functionalities of the web-server software 7 of the control system 2 for dedicatedly handing HTTP protocol or other web protocols if there is needs for web-based communication with the client 10 or with the other provisioned systems 3 or with the control system 2. The software modules 8 could be commercially available web server software 7 or any proprietary software. The service software modules 8 could be implemented with any suitable programming languages such as C, C++, Java, or JavaScript.

Net 11 and Net 12 are the network infrastructures that are capable of providing communication links between the control management system 2, console systems 1, client systems 10, and/or provisioned systems 3.

The client systems 10 may not be a part of the CCDSVM, but with the permission and authorization, users from the web-browser 9 of the client system 10 can login on the CCDSVM and access the permitted resources of the CCDSVM by following a web URL link of the CCDSVM. While the privileged users can obtain, manage, access, and/or operate system resources resided in the CCDSVM through the WCUWE, regular (non-privileged) users at the client systems 10 may be permitted to access only limited system resources of the CCDSVM.

The CCDSVM configuration, in one embodiment, includes four data flow paths. First data path comprises communication links between the web browser 9 of the client host 10 (or console host 1 or control management system 2) and the web handling software on the control system 2 (such as web-server 7 or console support software 6). With this path of data flow, whenever a user sends a request from the web-browser 9 to the web-server 7 or the console support software 6 to access a target system, the console support software 6 collects required information, for example, from a target provisioned systems 3, and converts the collected information into standard structured information (web-format) for web communication. The targeted system could be one of the provisioned systems 3 or the control system 2. The information collected by the console support software 6 of the control system 2 could be the system status, or the storage information, or the network information, or the user authentication profile, or the file system information, or files & folders information resided on the control system 2, or on any targeted provisioned system 3. The console support software 6 then passes this converted structured information to web server software 7 and further transmits to the web-browser 9 through a communication link of the Net 11 and Net 12 so that the collected information can be displayed and viewed by a user via the conventional web browser 9, as shown in FIG. 1.

The communication protocols used between the web-browser 9 of the client system 10 (or the console system 1 or the control system 2) and the web server 7 of the control system 2 could be HTTP, HTTPS (SSL encrypted HTTP protocol) or any suitable web protocols for web communication, which could successfully transmit the data across the web or could be other standard or proprietary IP-based on non-IP-based protocols. This data path may be referred to as the console support software 6 transmits data to/from the web-browser 9.

The second data path is the data flow through communication links between the control system 2 and provisioned systems 3. Requests targeting to a provisioned system 3 are received by the console support software 6 of the control system 2 and then send to the service modules 8 of the provisioned systems 3 through communication link network 12. When the requests are received by the provisioned system 3, the service modules 8 of the provisioned system 3 carry out the requested tasks, and then send the response back to the console support software 6 of the control system 2. The implementation of the actual products of this invention on the second data path may use proprietary TCP/UDP/IP based protocols for the communication between the provisioned systems 3 and the control system 2. However, other standards or proprietary IP-based or any suitable non-IP-based protocol are also possible. The communication protocols used between the console support software 6 of the control system 2 and the service modules 8 of the provisioned system 3 can be any suitable IP based or non-IP based protocols, whichever is suitable to transmit data between them. The typical data flow through this path could be the boot message, system status, network information, or storage information of the provisioned system 3 as shown in FIG. 1.

The third data path is the data flow between the provisioned systems 3 and the client system 10 or the console system 1 via the communication links of the net 11-12. Referring back to FIG. 1, the console support software 6 of the control system 2 may, in one embodiment, present a web link, which points to an object on a provisioned system 3, to a user working at the web-browser 9 of the client system 10 or the console system 1 or the control system 2. The object pointed by the web link on the provisioned system 3 could be a text file, MPEG video, PDF document, MS Power Point, Word documentation, etc. It also could be a link of another web service application program. From the web browser 9, a user can directly access the information on a provisioned system 3 pointed by the web link without go through the control system 2 again. In this case, the service modules 8 of the provisioned system 3 also include web server software modules 7 or equivalent one to directly support the web browser 9 as mentioned before. The communication protocols with the third path could be web protocols such as HTTP or WAP. Alternatively, the communication protocols can be other standards or proprietary IP-based or non-IP-based protocols. To simplify the discussion, the data transmitted on this path will be mentioned as the service software module 8 that send data to or receive data from the web-browser 9 and/or vice versa.

The fourth data path is data flow through communication link between a provisioned system 3 and another provisioned system 3. With this path, the service modules 8 of one provisioned system 3 can directly transmit data or information to the service modules 8 of another provisioned system 3 via a communication link of the Net 12 without going through the control system 2. The implementation of the actual products of this invention, for example, uses a proprietary IP-based protocol for communications between the two provisioned systems 3. The principle of this invention, however, does not rely on or limit to proprietary protocol. It should be noted that other standard or proprietary IP-based or any suitable non-IP-based protocol may also be possible. The data and information transmitted through the fourth data path can be various types of data. For example, a user at a web-browser 9 on a system may open a file folder on a provisioned system 3. The user can also instruct to transfer a file from a current target provisioned system 3 to another provisioned system 3 by, for example, a mouse click. The data file will then be transferred directly between the two provisioned systems 3 without going through the control system 2.

Figure 2A:
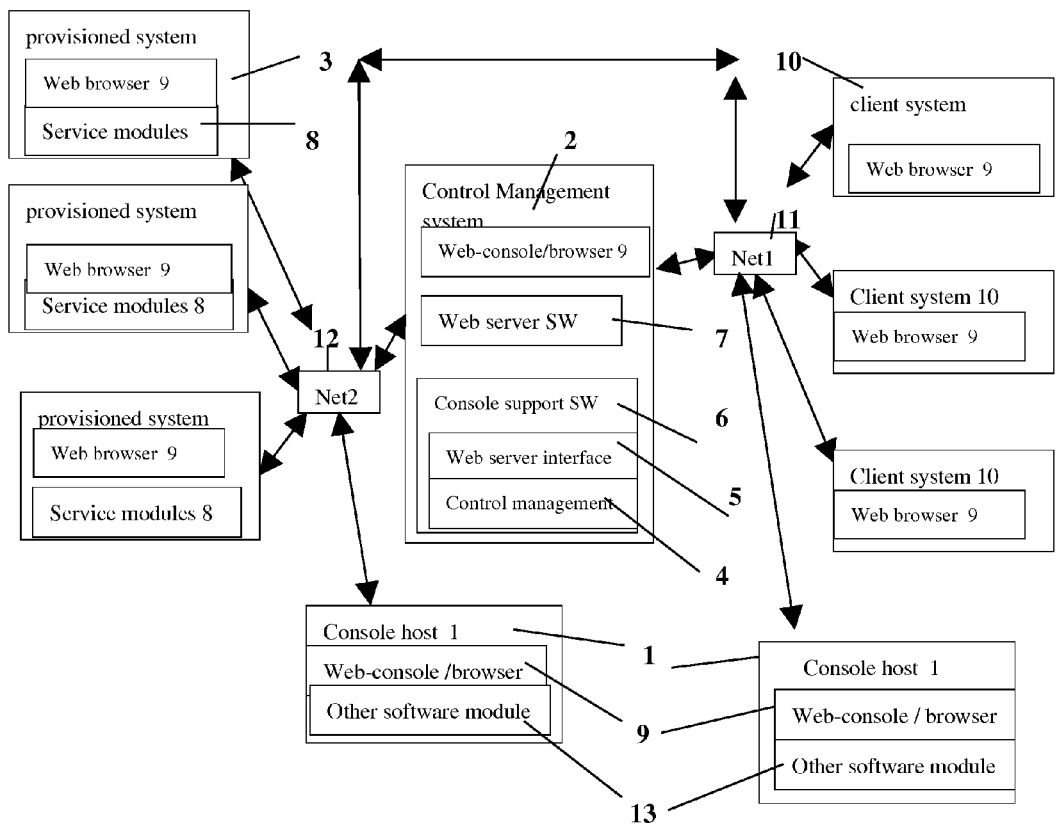
FIG. 2A is a block diagram illustrating a layout of a CCDSVM with which users from their web-browser of provisioned system can communicate with each other in accordance with another embodiment of the present invention.
Figure 2B:
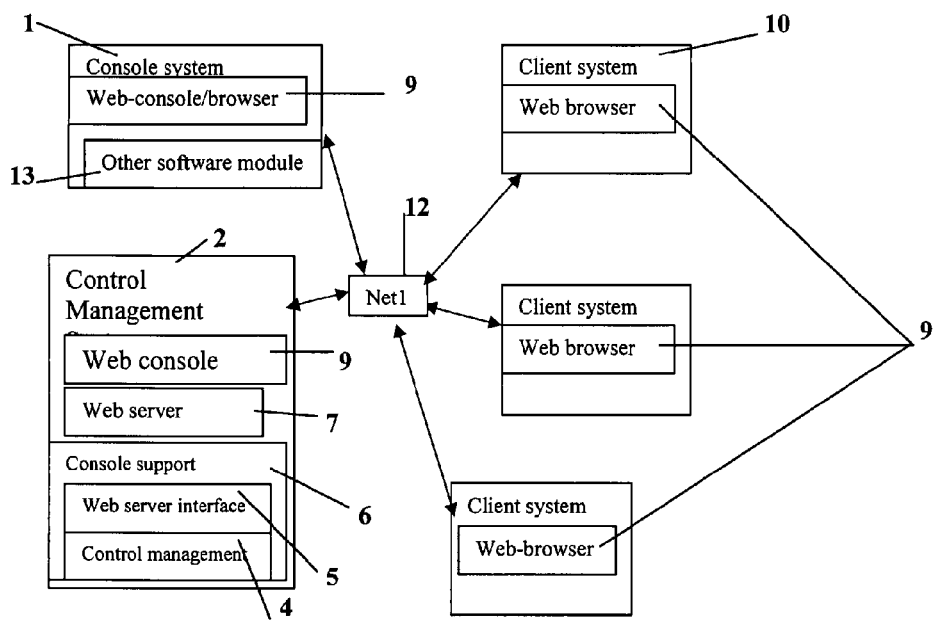
FIG. 2B is a block diagram illustrating a layout of a CCSDVM with only a single control management system to be accessed by massive client systems in accordance with another embodiment of the present invention.

FIG. 2A illustrates a variation of the CCDSVM platform for the web based communication in accordance with one embodiment of the present invention. The CCDSVM platform illustrated in FIG. 2A is similar to the platform illustrated in FIG. 1 except every provisioned systems 3 includes a web-browser 9. Thus, with proper authentication process, each user of provisioned systems 3 may access, manage their own provisioned system 3 from the web-browser 9 either on their own local provisioned system 3 or on any client system anywhere on the network. It should be noted that when a user is registered with a provisioned system 3, the user is authorized to access provisioned system 3 locally but not with the CCDSVM. On the other hand, when a user is registered with CCDSVM, the user is then authorized to access the multiple provisioned systems 3 and the control system 2 of the CCSDVM.

FIG. 2B illustrates another example of a variation of the CCDSVM in which there is no provisioned systems 3 in the CCDSVM. The Control system 2 can run on its own and the CCDSVM has degenerated into a single stand-alone system (FIG. 2B), and users through web-browser 9 on any client system 3 (or on console system 1, or on stand-alone control system 2) are allowed to access and operate the permitted resource objects and system resources on the stand-alone control system 2.

Unless specifically specified, the console support software modules 6 of the control system 2, the provisioned systems 3, the service software modules 8 of provisioned system 3, and the web-browser 9 on the control system 2, the client system 10, and the console system 1 are referred to the WCUWE of the CCDSVM platform illustrated in FIG. 1.

Figure 3:
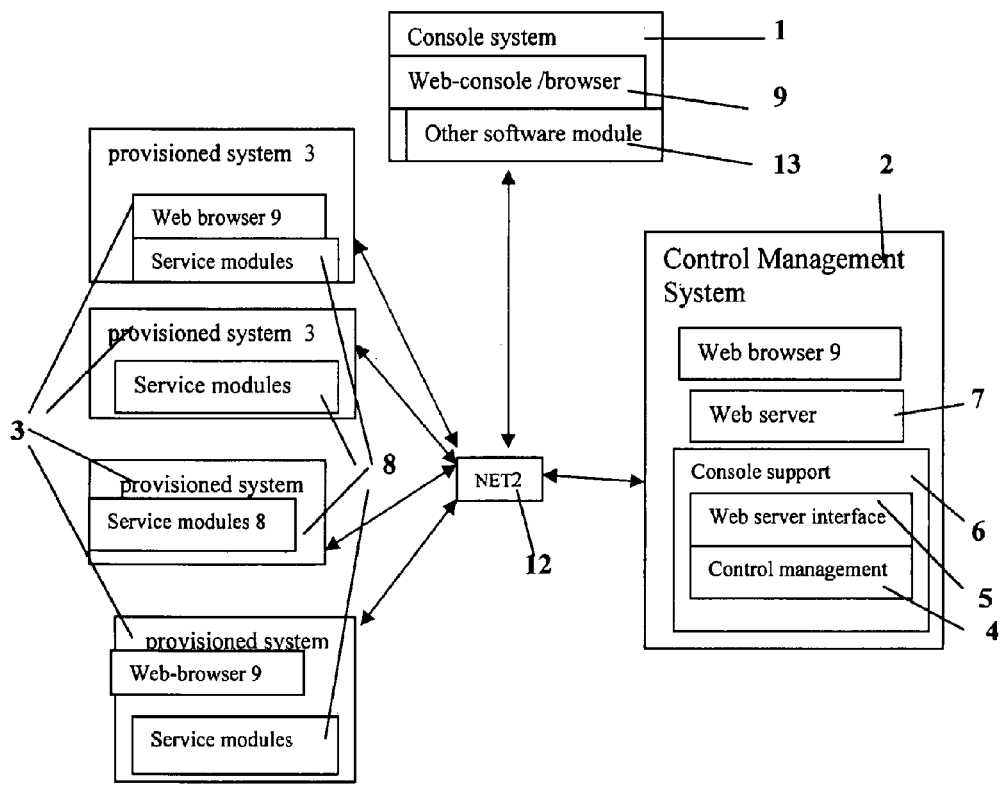
FIG. 3 is a block diagram illustrating an example of a software for a CCDSVM in accordance with one embodiment of the present invention.

A web-based computer user work/operation environment ("WCUWE") of CCDSVM is a software infrastructure, shown in FIG. 3, which provides each permitted user to log on the CCDSVM and further provide each user a private web based operating environment, which is a private work space including the assigned and permitted resources on the control system 2 or on the provisioned system 3 across the network. The WCUWE further provides each user from a single web-browser to access the CCDSVM including to perform various permitted tasks and operations over various system resources (FIG. 5), wherein the tasks can be performed concurrently from the single web-browser.

The tasks include allowing privileged users to create users, groups, assign users to each group, to assign initial associated system resources to each user or group, and to save the information of created users and groups into a database stored on a storage media of the control system 2. The information needed for creating users or groups include user names, user IDs, assigned security permissions, passwords, access points, group names, group IDs, maximum members in a group, and so forth. The tasks also include various system operations such as manage network, storage, file system, folder, files, messages, user security, without limits.

The database is organized as one or more lists of tables, wherein each of the lists contains various resources. The resources could be one or multiple users' information, one or multiple systems' information, one or more network cards, and one or more disk drives information. Often, the words of resource, resource information and resource object may be used interchangeably in present invention. The storage media could be internal storage or external storage media, for example.

The WCUWE of the CCDSVM includes software modules of present invention. For example, the software includes the console support modules 6 of the control system 2, the service software modules 8 of the provisioned system 3, the other service software 13 of the console system 1. The current implementation of the WCUWE is based on a proprietary design of this invention. However, the nature and spirit of this invention does not limit to proprietary designed software. The WCUWE of the CCDSVM also includes other proprietary software modules or conventional software such as the web-server 7 of the control system 2, the web-browser 9 of the control system 2, the client system 10, and console system 1.

The WCUWE of the CCDSVM can be implemented with any suitable or combination of various suitable programming languages such C, C++, Java, JavaScripts, HTML, XML, and so on. To simplify the discussion, the WCUWE will be used to represent software modules in the CCDSVM described above.

Users of the CCDSVM include those created by the CCDSVM though a given process or any users on the Internet, Intranet, LAN without registering with CCDSVM. The WCUWE of the CCDSVM provides user to access various resources and perform various tasks through a preferred interacting model of, for example, via mouse clicking on graphically represented resource objects displayed in the browser 9.

Figure 4A:
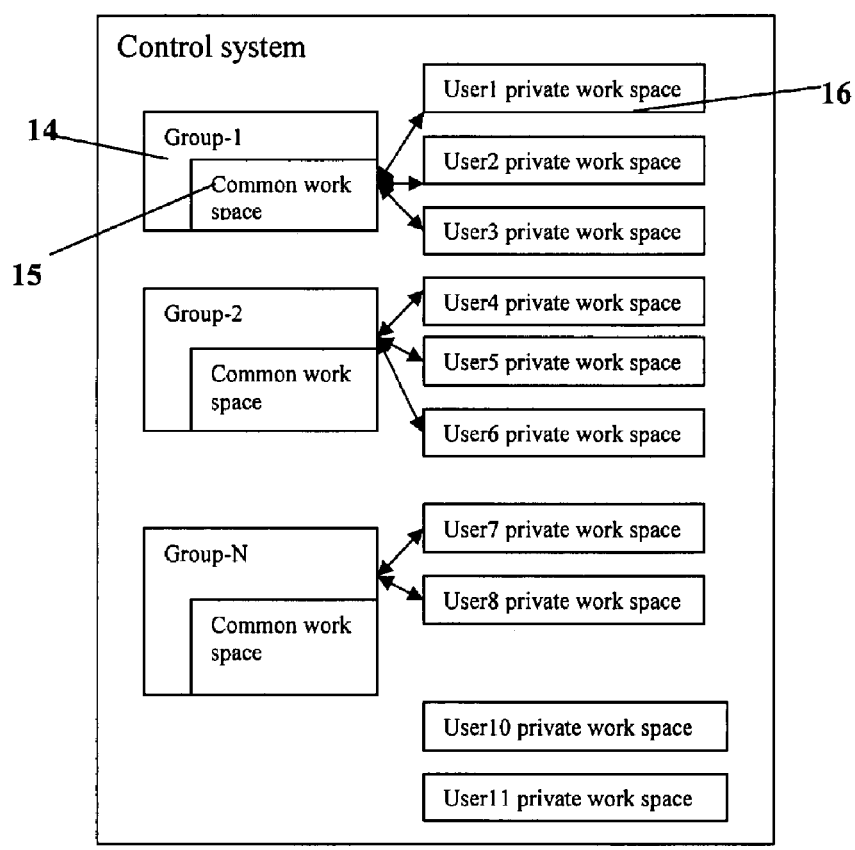
FIG. 4A illustrates an example of a dynamic work space in accordance with one embodiment of the present invention.

The WCUWE is designed to be operated on a CCDSVM platform, and specially is designed to provide dynamic work space (FIG. 4A) to each user associated with various CCDSVM. The WCUWE further executes tasks of instantly posting or un-posting private resources information submitted by a user for communicating with peers in a group or to each one of peer users not in a group or not in a same group, or to massive public users on the network, wherein the massive public users may do not have accounts with the CCDSVM platform.

The dynamic work space of the WCUWE is a centrally controlled collection of each group's work space and/or user's work space. The console support software 6 of the control system 2 of the CCDSVM will assign each user a private work space and each group a common work space when each user or group account is created by a privileged user after the WCUWE, which includes software modules on the control system 2 and provisioned system 3, enter into an operational male. When a user or a group account is created, each user is assigned to a specific user security scope and permission. An important aspect of the WCUWE of the CCDSVM is that it assigns each user and/or each user-group a working space based on user and group security permission.

A work space is an organized information structure, which can be saved on storage media of memory or disk drives or both of memory and disk drives by the console support software modules 6. A work space is created during a privileged user performing the asks of creating user or group. The work space will be initiated and assigned with of the CCDSVM as shown in FIG. 5. Various system resources on either the provisioned system 3 and/or on the control system 2 include respective memory, system-groups, systems in system-group, file system, file folders, files, storage media, network media and so on. The common work space 15, shown in FIG. 4A and FIG. 4B, of each group may be initially assigned with information of system resources (FIG. 5) such as users in this group, message area, file systems, folders and files resided on a specific provisioned system 3 or on the control system 2, and so on. The resources information in the common work space 15 may also be dynamically assigned or allocated by permitted user after creating group account. For example, during an online interactive meeting, a user posts a file to the common work space, so that a new entry of a file node is added to a file and folder tree area of common work space. In addition, each group may be assigned to one or multiple users, wherein each user can also be assigned with a private work space 16 of FIG. 4A and FIG. 4C during user account creation time. The private work space may also be initially assigned with system resources of the CCDSVM during user account creation time. Alternatively, the private work space can be dynamically assigned with the resources of the CCDSVM after the user account is created.

For example, a privileged user can dynamically permit or deny a general user to access a list of storage devices. During the operation, therefore, at one second, the user may see the list of the storage devices from user's web-browser, and at another second, the general user will no longer see the list of the storage devices. Also, if the user is authorized to access the list of the storage devices on a provisioned system 3, the user can further take one of the storage devices offline so that the list of the storage devices on the provisioned system 3 will have one less devices to be displayed.

In another example, at one second, a privileged user grants a general user to access a file J in a folder N resided on a system M of the CCDSVM, and at another second, the privileged user resets the previously granted permission, therefore, the general user can view and access the file J in the folder N on the system M of the CCDSVM at one time, and a second later, the general user can no longer view and access the file J. The actual implementation of console support software 6 of control system 2 has achieved this capability.

In addition, each type of resources in the work space is organized as a list of tables and can be stored in storage media in the control system 2. The integrity of security of each group is protected by limiting different resources to different group. As such, each group is authorized to have a limited view over assigned system resources on the provisioned system 3 as well as on the control system 2. The same security integrity at user level can be achieved by assigning different system resources of the provisioned system 3 and/or the control system 2 to different individual user based on assigned security permission. Therefore, each user is authorized to access and view the assigned resources.

Figure 4B:
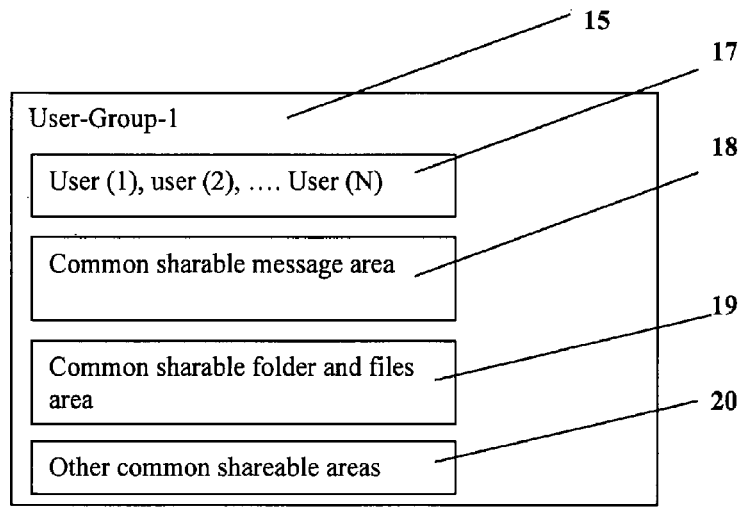
FIG. 4B illustrates an example of resources which may be assigned to a user-group common work space in accordance with one embodiment of the present invention.
Figure 5:
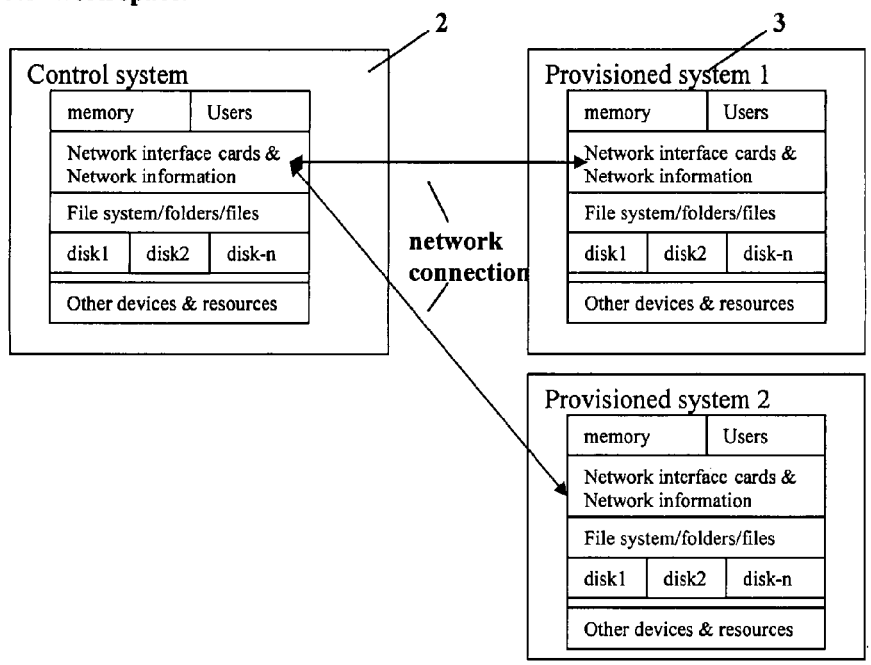
FIG. 5 illustrates an example of resource objects resided on the systems in accordance with one embodiment of the present invention.

FIG. 4B has shown an example of a group common workspace 15 which can hold the assigned resources. The group workspace 15 includes user area 17, message area 18, and folders and files area 19, and other area 20 in the user group. The messages from each user in the common message area 18, and the information of folders and files in common files and folder area 19 can be shared by all users in the same user group. All resources in each common work space of each user group can be selectively displayed in the web-browser 9 of each logged in group member, wherein the resources in the group workspace is included into a web page via converting the resource information into a presentable web-format(web-page) by the console support software 6 of the control system 2 of CCDSVM for displaying.

Figure 4C:
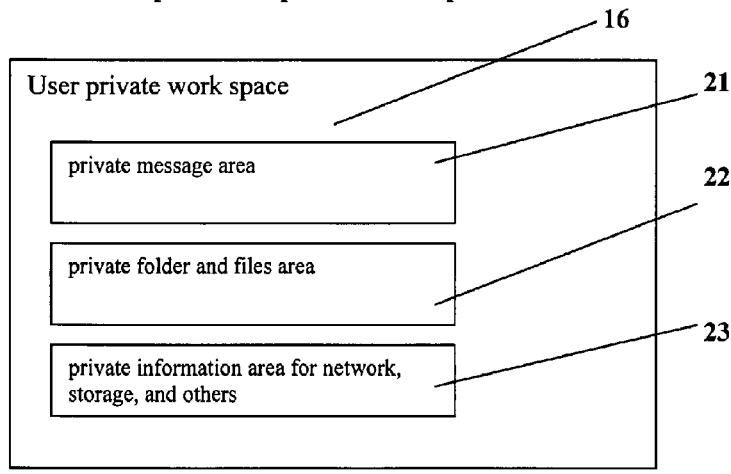
FIG. 4C illustrates an example of a user private work space and possible assigned system resources in accordance with one embodiment of the present invention.

FIG. 4C has shown an example of resources in a private work space 16 assigned to a user. The private workspace 16 has a private message area 21, private file and folder area 22, and private accessible information of network or storage or others area 23. The assigned resources only can be exclusively viewed and accessed by the designated user unless he/she agrees to share with peer user crossing group boundary or with peer users in a same group. The folder (directory) is a data structure which can hold one more files and sub-folders at logical file system level and to be stored at physical level on storage media.

Figure 8A:
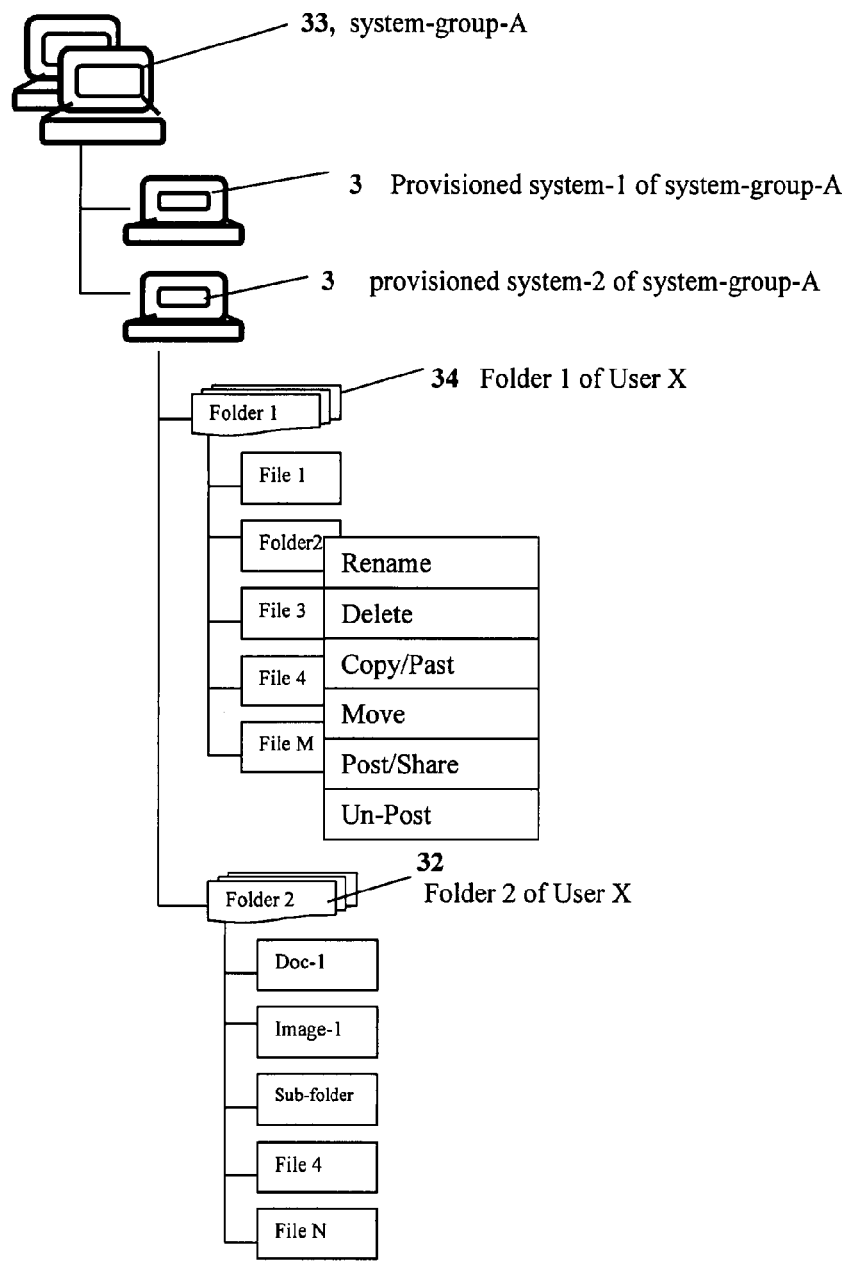
FIG. 8A is an example of a web-based graphic presentation of the assigned resources in a user X's private work space in accordance with one embodiment of the present invention.

FIG. 8A has shown an example of displaying an actually implemented portion of web-page encoded with assigned resources in private work space of a user X. The web page includes a system-group-A 33 on said network, multiple provisioned systems 3 under the system-group-A, private folders 32 and 34 of the user X resided on a system of the CCDSVM, and files under the folders 32 in the displayed private work space of the user X.

Figure 8B:
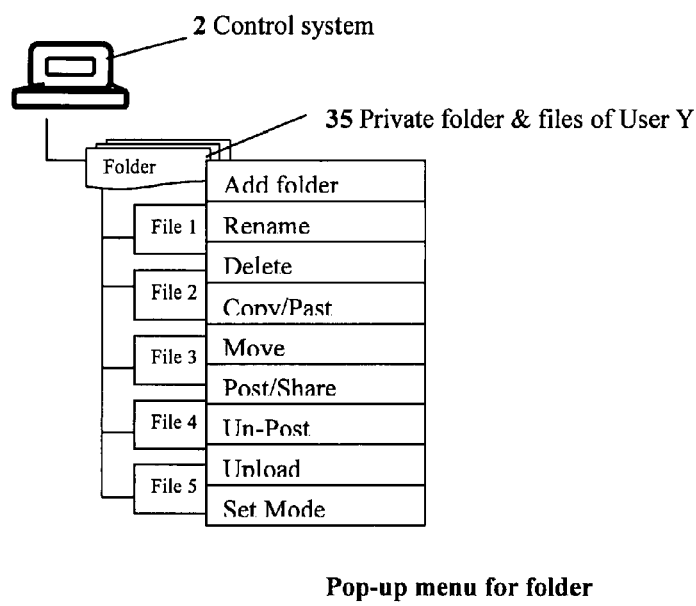
FIG. 8B is an example of a web-based graphic presentation of assigned resources in the private work space of a user Y in accordance with another embodiment of the present invention.

FIG. 8B has shown another example of displaying an actually implemented portion of a web-page encoded with assigned resources in a private work space of a user Y, which includes control system 2, private folder and files 35 of the user Y.

The private work space of the user X and user Y may also include private message area 21 and other resources, which are not displayed in FIG. 8A & FIG. 8B because the WCUWE is designed to dynamically display part of user's private work space whenever there is needs.

It is notable that said user X and user Y, may be in same user-group such as in a group-1, however, each of them could have a significant different scope of the private work space assigned by the console support software 6 of the control system 2 due to each of them is assigned with very different resources on the systems of the CCDSVM depending on each user's role and security permission, which is setup by said privileged user of the CCDSVM through web-based user interface provided by the said console support software 6.

The FIG. 6C and FIG. 6D are examples of a web-page displayed in each web-browser 9 of the user X and user Y in the user group-1 before an interactive online meeting. As shown in FIG. 6C and FIG. 6D, the user X or user Y or other users (who's web-page/browser did not depicted) in the same user group-1 have entered a group online meeting after each of them logged on the CCDSVM via each browser 9 on any computing system across said network. Also, each of the users will get an identical web-page layout provided by the console support software 6 of the control system 2 except with different contents in the displayed private work space section of the web-page due to each user has assigned with different resources. The web-page screen layout provided by the console support software modules 6 contains four sections:

1) a private user message input area (section-1),
2) a message displaying section for common message area 18, illustrated in FIG. 4B, for all users in user group-1 (section-2),
3) a file or folder display section for group common file and folder area 19, illustrated in FIG. 4B, for all users in same user group-1 (section-3), and
4) a file and folder tree displaying and management section (section-4) for folder and file tree in private file and folder area 22, illustrated in FIG. 4C, of a user's private work space 16.

Initially, the section-1, section-2, and section-3 are all empty due to no one has post any file or message yet. The console support software modules 6 of the control system 2 obtain each login user's portion of assigned folders and files for the online meeting from the stored private file and folder area 22, illustrated in FIG. 4C, of the private work space 16 of each user, and further converts said file or folder information to presentable web-format(web-page) for being displayable in said section-4 of the web-page in web-browser 9 of each user. The choice of total four sections of the web-page layout and the order of each section on the browser screen 9 is irrelevant to this invention since other choices of designing are also possible, and further, this invention does not have limitation on what web-screen layout shall be. The information of the file or folder includes the system name where the file or folder resided, the named and path of the file or folder, the owner of file or folder, the time stamps, the size of the file and so on without limitation.

During the interactive online meeting, the console support software modules 6 provide each user to post or un-post files or folders to said section-3 of displayed group's common documents and contents management section with several steps. First, for example, providing said user X to click on one targeted file "Doc 1" 24 or folder at a time in section-4 of displayed said file and folder management area of the user private work space. Second, providing the user to select the operation of either post or un-post from an operation menu (see FIG. 9A, FIG. 9B, FIG. 10A and FIG. 10B). Finally, the user can click on the selected operation to submit the task of either post or un-post for the selected file or folder.

Figure 6A:
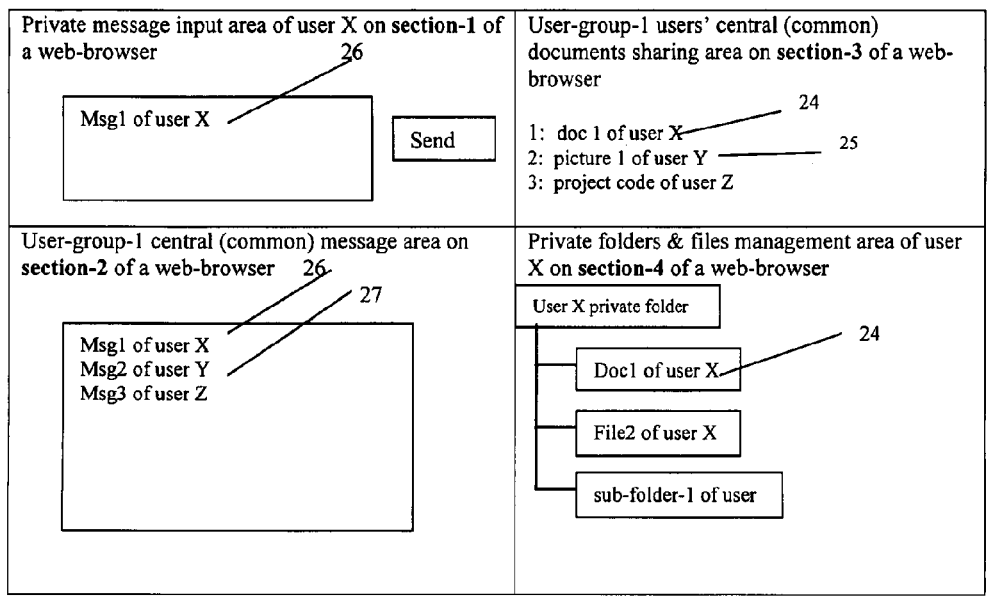
FIG. 6A illustrates an example of displaying a web-page with 4 sections in a web-browser of user X in a user-group during an interactive online meeting in accordance with one embodiment of the present invention.
Figure 6B:
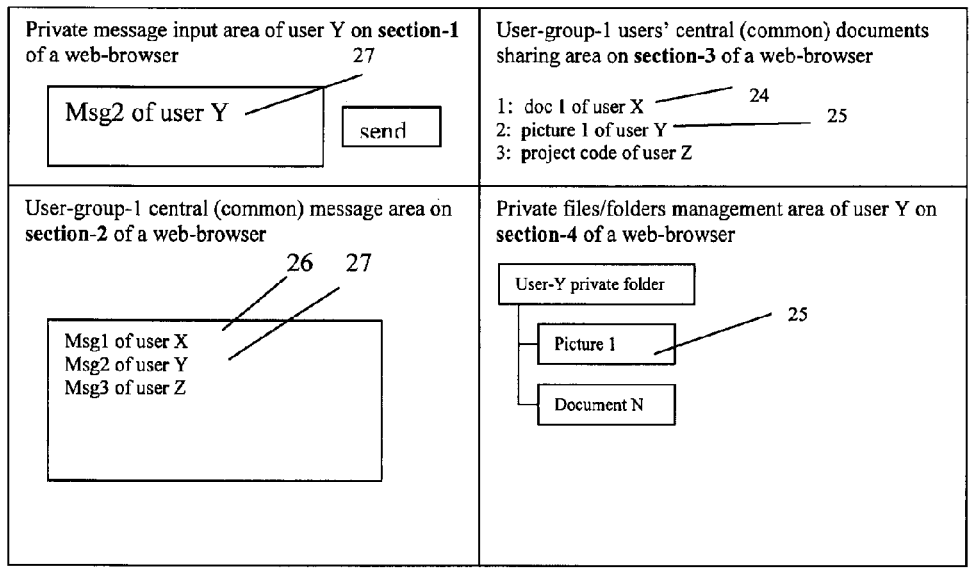
FIG. 6B illustrates an example of displaying a web-page with 4 sections in a web-browser of a user Y in a user group during an interactive online meeting in accordance with another embodiment of the present invention.

Each user with permission may perform un-post operation if such user has at least a previously posted file or folder, which has already displayed in section-3 of the common document and content management section of the web-browser 9 of the user in the same user-group, see FIG. 6A or FIG. 6B for example.

If a file is selected, the file operation menu is used and if a folder is selected, the folder operation menu is used respectively. It is also possible to only provide one menu for both file and folder operation by the console support software 6. The operation menu either can be pop-up menu for folder as shown in FIG. 9A or pop-up menu for file as shown in FIG. 9B, or non-pop-up menu for folder as shown in FIG. 10A or non-pop-up menu for file as shown in FIG. 10B. The choice of operation menu is irrelevant to this invention although the actual implementation of this part of invention has used pop-up menu, and as matter of the facts that there is no limitation on how the operation menu is to be designed in this invention.

In the example of FIG. 6A, the user X can post a file named "Doc 1" 24 to said section-3 of the common document and contents display section of a webpage in the web-browser 9, In the example of FIG. 6B, the user Y also can post a file named "picture 1" 25 to the common document and contents display section of a web page in the web-browser 9. In addition, another not depicted user Z posted a file of "project code". The files or folders could be one resided on the control system 2 or on any provisioned system 3 of the CCDSVM.

In addition, during the interactive online meeting, the console support software 6 of the control system 2 also provides each user to post message to massive users in the same group via said section-1 of the private user message input section by typing a message and click on the "send" button. In the example of FIG. 6A, the user X posted a message of "Msg1 of user X" 26. In the example of FIG. 6B, the user Y also posted a message of "Msg2 of user Y" 27. In addition, another non depicted user Z posted a message of "Msg3 of user Z". As a result, all of three messages were displayed in the same section-2 in each user's browser via mentioned web page.

In a specific situation, the console support software 6 also provides permitted user to un-post the previously posted message. Just for example, in FIG. 6A, the console support software 6 provides the permitted user X to select a previously posted "Msg2 of user Y" 27 via said section-2 of the common message display section of the web page in said web browser 9 of the user X, and select un-post operation via said operation menu and submit the selected un-post task.

The detailed information of how the post or un-post task to be implemented will be discussed in next two paragraphs. In addition, with this invention, the action of the "post" information such as posting information of files or folders or messages or other resources is equivalent to the action of "share" the information. The action of "un-post" information is equivalent to the action of "un-share" the previously posted or shared information, in other words, "remove" the previously posted or shared information.

After user's submitting of the post or un-post task via the web browser 9 of the console system 1 or client system 10 or control system 2, the task information is transmitted to the control system 2, and the console support software 6 of the control system 2 obtains and parses the task information to determine: who is the original user initiating the task; what type of task; what type of associated resources for task to work on; who is the targeted user; and what is the time stamp, and may also include other information without limitation. The console support software 6 further determines that if the task is to post a file or folder from the original user, the console support software 6 picks up the corresponding file or folder information from file and folder area 22 of FIG. 4C of the private work space 16 of the original user and then deposits such information to the file and folder area 19 of FIG. 4B of the common work space of the group in this case.

If the task is to un-post a previously posted file or folder that is posted by a specific user in the common work space 15 of the group, the console support software modules 6 search for the corresponding information of the file or folder in the file folder area 19 of the common work space 15 of the group and further remove the entry of matched information from the common work space 15 of the group after it is found.

If the task is to post a message to users in the group, the parsed message with be stored in the private message area 21, illustrated in FIG. 4C, of the original user's private work space 16, illustrated in FIG. 4C, and also is copied to the message area 18, illustrated in FIG. 4B of the common work space 15, illustrated in FIG. 4B of the user-group by the console support software modules 6.

If a task is to un-post (delete/remove) a previously posted message, the console support software 6 searches for a matching message in the common message area 18, illustrated in FIG. 4B, of the common work space 15 of the user group and remove such message entry if it is found based on the message and original user's identification and other associated information such as time stamp, security permission and so on without limitation.

It shall be noticed that the task of un-posting a file or folder of this invention does not actually delete information of the file and folder from the original user's private work space. In addition, a lock protection mechanism is deployed whenever a message or information of a file or folder is written, stored, or deposited to either said private space 16 or said common work space 15 that are resided on disk drives or other storage media. Throughout the rest of discussing, the lock protection is assume to be a default action without further mentioning whenever a write/store/deposit action take place. As matter the fact, each task of posting file, folder, and message as well as the task of un-posting the previously posted file or folder, or message performed by each of the users in each of the groups of this invention can be executed by the console support software 6 instantly with memory speed.

FIG. 6A and FIG. 6B illustrate that after the console support software 6 of the control system 2 successfully executing the tasks for each user in each group, any user in the user group can get a fresh view of the section-2 of the common messages display area of the user group-1, and a fresh view of the section-3 of the common documents & contents display area of the user group-1 via a web page in each user's web browser 9 on the client system 10 or on the control system 2 or on the console system 1.

User can manually click on a refresh-button, which does not show in the FIG. 6A and FIG. 6B, to refresh for the section-2 or section-3 of a web page in the browser 9. Also the section-2 or section-3 of the web page in the browser 9 can be automatically refreshed. As mater of the fact, optionally, the console support software 6 can encoded a run-time script in said web-page, which is encoded with the presentable web-format and to be loaded in the web-browser 9 after each user logged into the CCDSVM and started group online meeting.

The run-time script will automatically and periodically perform tasks of refreshing for the section-2 and section-3 of the web page in the web browser 9. The frequency of the periodic refreshing can be adjusted by the console support software 6 of the CCDSVM depending on the needs of the meeting, which typically can range from 1 to 3 seconds and there is no limitation on this aspect. Also, with the preferred example, said run-time script provided by the WCUWE is a JavaScript, however, other type of programming scripts or methods are also possible and there is no limitation on what kind of run-time program shall be used in this invention. In addition, the console support software 6 provides each user the choices of either automatic or manual refreshing the web page in their web-browser 9.

Upon performing of refreshing for the section-2 or section-3 of the web page in the web-browser 9 of a user, a request of updating such web page screen will be generated and sent from the web-browser 9 to the control system 2. The console support software 6 obtains and parses each request to determine what user group and which part of the common work space 15 of the user group need to be used for updating the web page.

Based on information of each parsed request, the console support software 6 of the control system 2 retrieves information of the updated resources and objects from said common work space 15, illustrated in FIG. 4B, of the user group, which includes recent posted files, folders, or messages from each user in the user group, or includes remained files, folders and/or messages after one or more un-post operations. Finally, the console support software 6 of the control system 2 converts and encodes the retrieved information of the resources and objects to the presentable web-format (web-page).

If the request is for updating the group messages, the converted information is displayed in the section-2 of the group common message display area via the web page in the web browser 9. If the request is to update the group common files and folders display area, the converted information is displayed in the section-3 via the web page in the web-browser 9. Therefore, after refreshing for the sections of the web page in the web-browser 9, each user can have an identical view of all posted files and folders from the section-3 of group common document display area in the web page in the browser 9, and can have an identical view of all messages from the section-2 of the group common message display area via the web page in web-browser 9 that are posted by all other users in a same group. Meanwhile the console support software modules 6 still allow each user kept most of the resources and objects in their own private work space un-exposed to other users in the same group during the online interactive meeting.

For example by referring the FIG. 6A, the User X at his/her web-browser 9 can see "picture 1" 25 posted by the user Y in the group common file and folder display area but can not see other information in the user Y's private work space area, and also see the "Doc 1" posted by the user X self. Also referring the FIG. 6B, the user Y at his/her web-browser 9 can see "Doc 1" 24 posted by the user X in the group common file and folder display area but can not see other information in user X's private file and folder display area, and also can see the "picture 1" posted by the user Y self.

A difference between a conventional Internet group communication model and the group based communication model described in the present invention is that the console support software modules 6 of the control system 2 provide each user to control post or un-post said resources from user's own private work space while the conventional Internet communication model are not capable of performing posting/un-posting task. Also, for example, un-posting a previous posted folder with the WCUWE of the CCDSVM does not require to delete the folder information in the user's private work space while the delete operation with existing Internet group communication model will completely delete the file or folder. The dynamic work space combines with security protection for the information has greatly improved the security, flexibility and efficiency of online meeting provided by the WCUWE of the CCDSVM to each users and groups.

In addition, with a preferred example, since posted information of each file is encoded by the console support software 6 with a web link and displayed in the section-3 of the web page in the web browser 9, therefore, each user in a user-group can click on the link to download the files, which provided in private file and folder area 22 of the private work space 16 of a peer user, from a computing system of the CCDSVM where the file is actually located. For example, the user X can download said "picture 1", which may reside either on the control system 2 or any provisioned system 3, posted by the user Y, and the user Y can download the "Doc 1", which may also reside either on the control system 2 or the provisioned system 3, posted by the user X at same time. This achieves a true peer-to-peer exchanging files resided on the permitted systems between permitted users in the user group. In addition, there is no size limitation on the file size for file to be downloaded, which is a gifted benefit from Internet technology. Besides the exampled and understandable method of download, other methods of retrieve peer users' digital documents or contents are also possible by deploying a more efficient proprietary file transfer mechanism to reach the results of said exchanging file. It shall be noted that the method of downloading is only applicable to the files and does not apply to folder and other resource information. To get a targeted peer user's entire folder and the underneath files and sub folders, a special files and folder transfer method is required.

As shown in FIGS. 9A & 9B, and FIGS. 10A & 10B, the console support software modules 6 of the control system 2 also provide each user to perform many other tasks during online meeting through said operation menu such as upload, rename, delete, copy/paste and so on without limitation. The upload operation allows each user to dynamically upload files one a time through the web-browser 9 from a local storage of the client system 10 or console system 1 to a storage space via the user's private work space 16 on the control system 2 during the meeting, and further to be posted to the common work space 16 of a user group that each user belong to.

In one embodiment, the mouse click driven copy/past operation allows files and folders from permitted folders of the permitted provisioned system 3 to be dynamically physically copied to a storage space via each user's private work spaces 16 on the control system 2, and the information of said files and folders could further to be displayed via said web-page in the browser 9 of each user and further to be posted to common work space 16 of the user group in which each user belong to. Such physical copying is in addition to direct posting these file or folders without the physical copying. As matter of the fact, operations provided by the console support software 6 of the control system 2 have added efficiency to posting or un-posting files and folders for each user depending on the real needs.

Additionally, the console support software 6 provides each user of each user group capability of saving the posted messages in the common message area 18 of the common work space 15 of the group into a file in the common file & folder area of the common work space 15 of the group. Further, the saved file can be viewed, and downloaded by each user in the user group after the saved file is posted. Besides whenever there is a need, the console support software modules 6 provide users to reset message area to be empty by removing all message entries in the message area 18 of said user-group's common work space 15.

A important fact is that the designed WCUWE of the CCDSVM has provided concurrent users each from a single web browser anywhere on the network to securely perform permitted various tasks that the tasks could be run concurrent within the single web-browser. Because the console support software 6 of the control system 2 let each user have exclusive view for resource objects in the user's private work space 16 and in the common work space 15 of a user group in which each user belong to, and let each user to manage resource objects via each one's own private space, the multiple users in multiple user groups can concurrently post or un-post files, folders, messages, or other resource objects without interfering users in other user-groups. Thus, the work spaces of each user and each group are well protected.

Hence, the console support software modules 6 of the control system 2 provide privileged users to perform tasks of creating multiple users and user groups on the control system, and each group can be assigned with variable size of users for online interactive meeting. The total number of the users and the total number of the user groups, and maximum number of the users per groups by the WCUWE of the CCDSVM to support is an implementation issue and depends on the capacity of the control system 2. The WCUWE of the CCDSVM and the CCDSVM has been designed with unlimited scalability for both users and provisioned systems 3. On the other hand, the spirit of this invention does not limit to with the boundary issues of the WCUWE and the CCDSVM.

FIG. 8A and FIG. 8B illustrate that each of user X and user Y has a different private work space 18 than others, and each of the users has assigned with different system resources. Without joining any group and participating any group meeting, the console support software 6 of the control system 2 also can provide user X and user Y to have peer-to-peer of instantly posting files or folders one a time to each other, or instantly un-posting (removing) the previous posed files and folders through similar steps for posting or un-posting materials in the group online meeting as bellow:

1) Provide each user to interactively perform selecting, for example, by mouse clicking, a source of file or folder for posting or un-posting;
2) Provide the user to select post operation from an operation menu if the user want to post any file or folder; or to select un-post operation from an operation menu if the user like to un-post a previously posted file or folder;
3) Upon submitting a task for posting or un-posting operation, provide each user to response to a prompt of "who is a targeted user?" that is provided by the console support software 6, and further submit the selected task;
4) Instructing the console support software modules 6 to obtain and parse the task information including original user, source of file or folder, type of operation, and other information;
5) If the type of the operation is post file or folder, instructing the console support software modules 6 to deposit the information of the source file or folder to the private file and folder area 22 of the private work space 16 of a targeted user. If the operation type is un-post a file or folder, instructing the console support software modules 6 to search a corresponding file or folder information from the private file and folder area 22 of the private work space 16 of the targeted user to match information of the source file or folder, if found a match, the corresponding entry of the file or folder is removed from the private file and folder area 22 of said private work space 16 of the targeted user; and
6) Upon the targeted user refreshing and retrieving the web-page via a web-browser 9 on a computing system, the console support software modules 6 retrieves and converts the updated information in the private file and folder area 22 of the private work space 16 of the targeted user into a presentable web-format (web-page) and transmit the web-page to the web-browser 9 on the computing system of the targeted user for displaying and viewing.

Figure 8C:
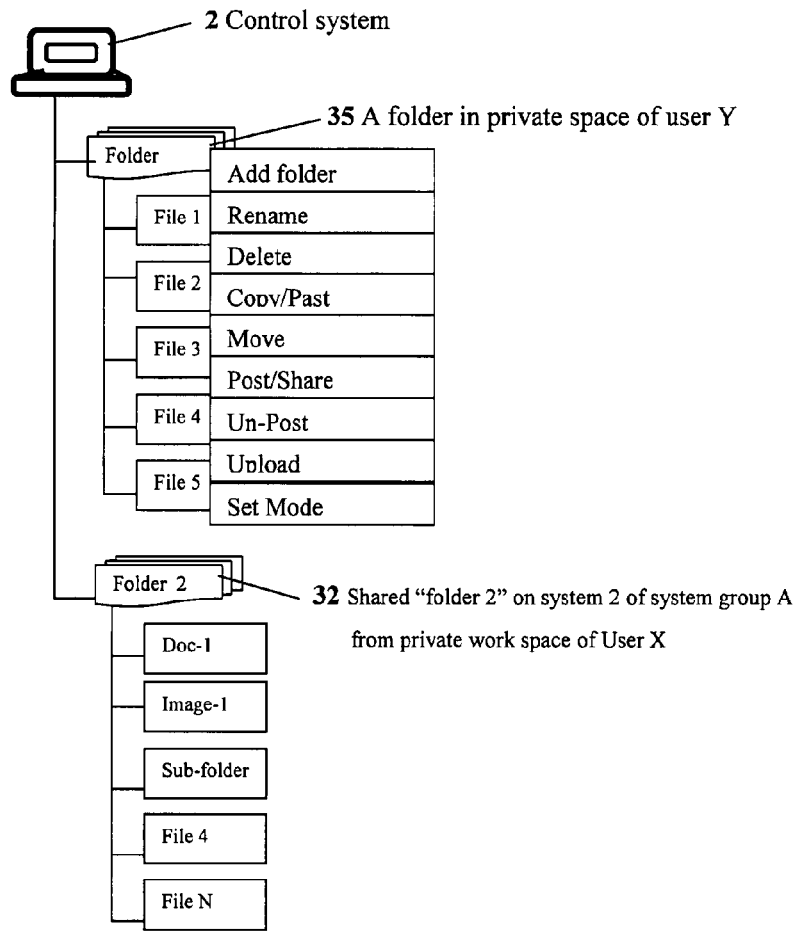
FIG. 8C is an example of a web-based graphic presentation of the user Y's private work space after the user X dynamically posted and shared "folder 2" in the user X's private space in accordance with another embodiment of the present invention.

For example, as shown in FIG. 8A, the user X can follow said steps 1) to 3) described above to post his "folder 2" 32 in the displayed files and folders area 22 of private working space 16 of the user X's web-browser 9 to the user Y. As shown in FIG. 8B, upon the user Y refreshing his/her web page in web-browser 9 on a computing system by walking through nodes in the displayed resource tree, the user Y will see the "folder 2" 32 in his/her displayed private file and folder tree in the private work space 16 of the user Y as shown in FIG. 8C. As matter of the fact, whenever walking through each node in a tree displayed in the web-browser 9, a request of refreshing web-page screen is generated and the request is handled as previously described.

Figure 7A:
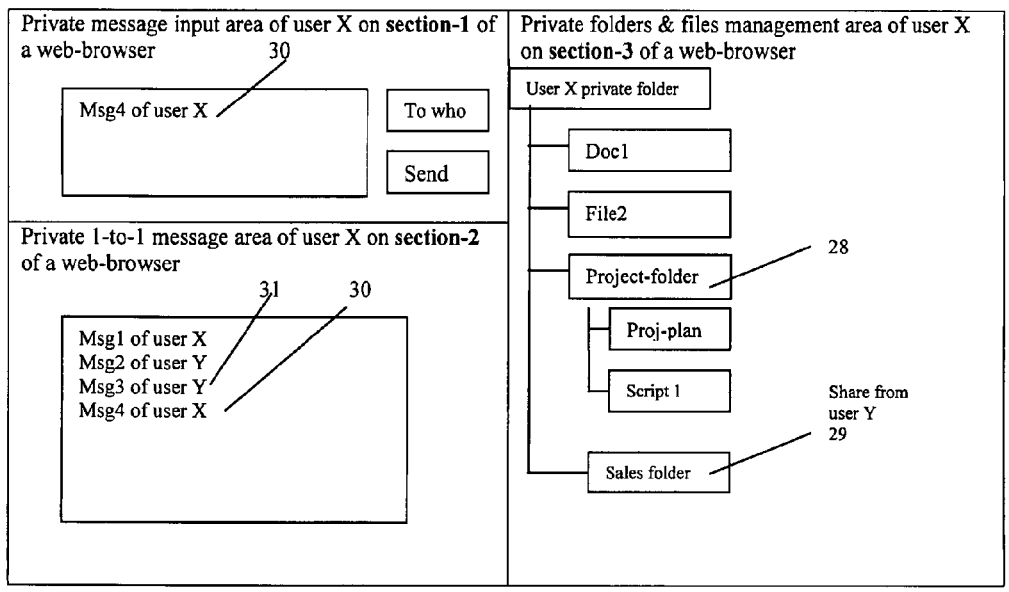
FIG. 7A illustrates one-to-one, peer-to-peer post or un-post messages and folders of the user X in accordance with one embodiment of the present invention.
Figure 7B:
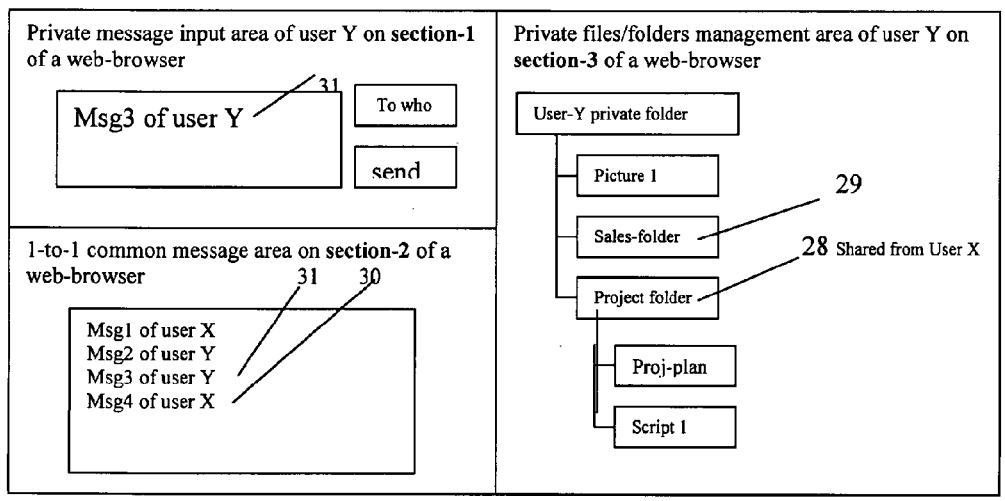
FIG. 7B illustrates one-to-one, peer-to-peer post or un-post messages and folders of the user Y in accordance with another embodiment of the present invention.

In addition to post messages in the group based communication involving parties with two or more users, the WCUWE of the CCDSVM also provides each user to post message to each other user in non-group based 1-to-1 message mode. FIG. 7A and FIG. 7B have shown an example of a user X and a user Y, who may not be in a same user group, however, the console support software modules 6 of the control system 2 provide each user to share and exchange messages with each other from a three-section web-page displayed in the browser 9.

The three-sections of the web page displayed in the browser 9 allows each of the users to apply the same steps of non-group based 1-to-1 model of posting files and folders or un-posting the previously posted files or folders as described previously for posting or un-posting messages. The three-sections included in FIGS. 7A and 7B just for a demonstration of how flexible of this invention is to display information under private work space of each user. Further, the number of sections in the screen layout and the order of each section in web-page display really is not a limitation to this invention.

The section-1 is a user message input area together with an additional input field of "To who" due to unlike in group online meeting, the console support software modules 9 have no knowledge of who is the targeted user in this case. Thus, each user can posting a message by following the similar steps as previously discussed. Nevertheless, unlike with group meeting messaging model, after obtaining and parsing information of the messages from each user, the console support software modules 6 of the control system 2 will deposit the message to both targeted user and the original user's message areas 21 of the private work space 16. Further, with same said steps of displaying messages in each user's browser, each user can view both own message and messages from peer user in section-2 of the browser 9.

For example, as shown in FIG. 7A, the user X input a message of "msg4 of user X" 30 and type "user Y" in input field of "To who", and then submit the message by clicking on "Send" button. Similar as shown in FIG. 7B, the user Y input a message of "Msg3 of user Y" 31, and type "user X" in input field of "To who", and then submit the message. Upon the refreshing a web-page in the web-browser 9 of each user, the user X will see the message 30 he/she sent and the message 31 from the user Y. Also the user Y will see both messages 30 and 31 at same time.

Again, the design choice of three sections of the web-page display layout and the order of each section is just a preferred example of implementation for non-group based peer user communication. This invention does not limited by web-screen display layout, for example, a screen display only with said section-1 and section-2 are also possible and so on without limitation.

The WCUWE of the CCDSVM has provided a security hierarchy for members of any team to work together cross multiple locations. With the security hierarchy and steps of posting or un-posting file and folder, the console support software modules 6 of the control system 2 can specially permit only a team leader with capability of posting folder or file to be viewed, shared, and accessed by all team members in a group environment or by an individual member in a non-group environment. In addition, the console support software modules 6 also provide each team member to post or un-post his/her file or folders to only a specific peer user one a time in non-group-meeting based environment. Again the said files or folders could be resided on the control system 2 or on any provisioned system 3.

It is relatively straightforward for the WCUWE of the CCDSVM, more specifically the console support software modules 6, to support massive online users, who do not have to have account with the CCDSVM to view the dynamically posted files, folders, or messages by users with user account of the CCDSVM.

Figure 6E:
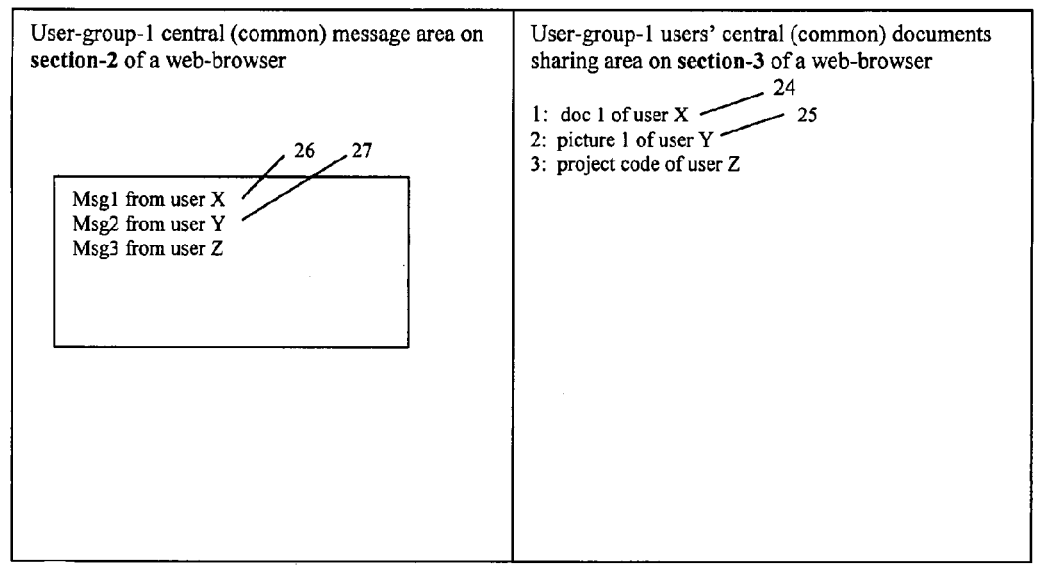
FIG. 6E illustrates an example of a displayed web-page that each massive online user can access and view from each of their browsers without login to the CCDSVM during said user X and user Y in the user group online meeting in accordance with another embodiment of the present invention.

In a preferred example, such as shown in FIG. 6E, the console support software modules 6 of the control system 2 provides a web-page to massive online users, who do not have to login the CCDSVM. The web-page, in one embodiment, could be layout with two major sections with section-1 to encode and display messages in the sharable message area 18 in a designated user-group's common work space 15 while the section-2 to encode and display file or folders in the sharable file or folder area 19 in the designated user-group's common work space 15.

Meanwhile, for users belong to the same designated user group, each user from a web-browser on any computing system across the network can log in the CCDSVM and further obtain the group online meeting web-page as shown in the exampled FIG. 6A for the user X and in FIG. 6B for the user Y. Further as described previously, each user in the designated user group can instantly post message to the message area 18 of the designated user group's common work space 15, or post a file or folder to the sharable file and folder area 19 in the designated user group's common work space 15. Also, each user in the user group can instantly un-post the previously posted files or folders by removing the corresponding file or folder entry in the file and folder area 19 of the designated user-group's common work space 15, or un-post the previously posted messages from the common message area 18 of the common work space 15 of the user-group.

Consequently, as previously described and as shown in FIG. 6E, the web-page for the online users is displayed in a browser 9 upon one of the massive online users to access the web page, where the online user may have no account with the CCDSVM. Also the web page can be dynamically updated, displayed, and viewed by the online user with the same pace as the dynamically updating and displaying of the section-2 and section-3 of a web-page in a browser 9 of the designated group's member as shown in the FIG. 6A and FIG. 6B. Again, the two sections of the web-page display layout is a preferred example and it does not limit this invention because with this invention other layout is also possible, for example, it may be desired to have web page layout only contains one section, which is either for messages or file or folder's display depending on the application's need.

As shown in FIG. 8A, FIG. 8B, and FIG. 8C, with non-group based peer-to-peer post or un-post files and folders, people may often do not remember how many files and folders have been posted for sharing. For example, as shown in FIG. 8A, the user X can select "folder 2" 32, select a post operation from an operation menu, and provide target "user Y" to share "folder 2" 32. As show in FIG. 8C, the user Y can see "Folder 2" 32 of the user X displayed in the web-browser 9 of the user Y after the user X post "Folder 2" 32. If the user X selects various files or folders for sharing with dozen of other people, the user X will have difficult time to remember what has been shared and shared to whom. As shown in FIG. 11, the console support software modules 6 of the control system 2 can provide each user, such the user X, a sharing list of how many files or folders have been posted for sharing and shared to whom.

As shown in FIG. 11, a personal share list is displayed in the user X's web-browser 9. For example, an entry of posted "Folder 2" is listed at bottom of the sharing list and it is posted/shared to the user Y because the user X has posted the "Folder 2" 32 depicted in FIG. 8A. Further, the console support software modules 6 provide each user to selectively un-post a previously posted files and folders via clicking on a "delete shared?" option in an operation menu for an corresponding entry in the sharing list in a web-page and further to submit an un-post task. For example, the user X can click on "delete share?" option to un-post the "Folder 2". Thereafter, as described before the console support software modules 6 of the control system 2 will execute the un-post task. As a result, upon refreshing a web-page in a web-browser 9 of the target user Y, in stead of seeing "Folder 2" 32 as shown in FIG. 8C, the user Y will see an updated web-page as shown in FIG. 8B such that the "Folder 2" 32 has been removed. The operation menu for "delete share?" depicted here just for example and it could be displayed in any other form.

In addition to provide original user in a user group to control the un-posting his own file or folder in a group based communication, the console support software modules 6 of the control system 2 may also provide a privileged user to un-post other people's previously posted files or files in the displayed file and folder section of a web-page in a browser 9. To support this capability, the console support software modules 6 will provide an operation menu to associate with the displayed files and folders in the display section, further to allow privileged user to perform similar un-post operation. After receiving the un-post operation, the console support software modules 6 will perform similar searching for selected file or folder in the group file and folder area 19, illustrated in FIG. 4B, of the group common work space 15 of the user group, if there is match the corresponding entry will be deleted. Also, the file and folder section of the web-page in the web-browser 9 can be refreshed accordingly as described before.

Figure 12:
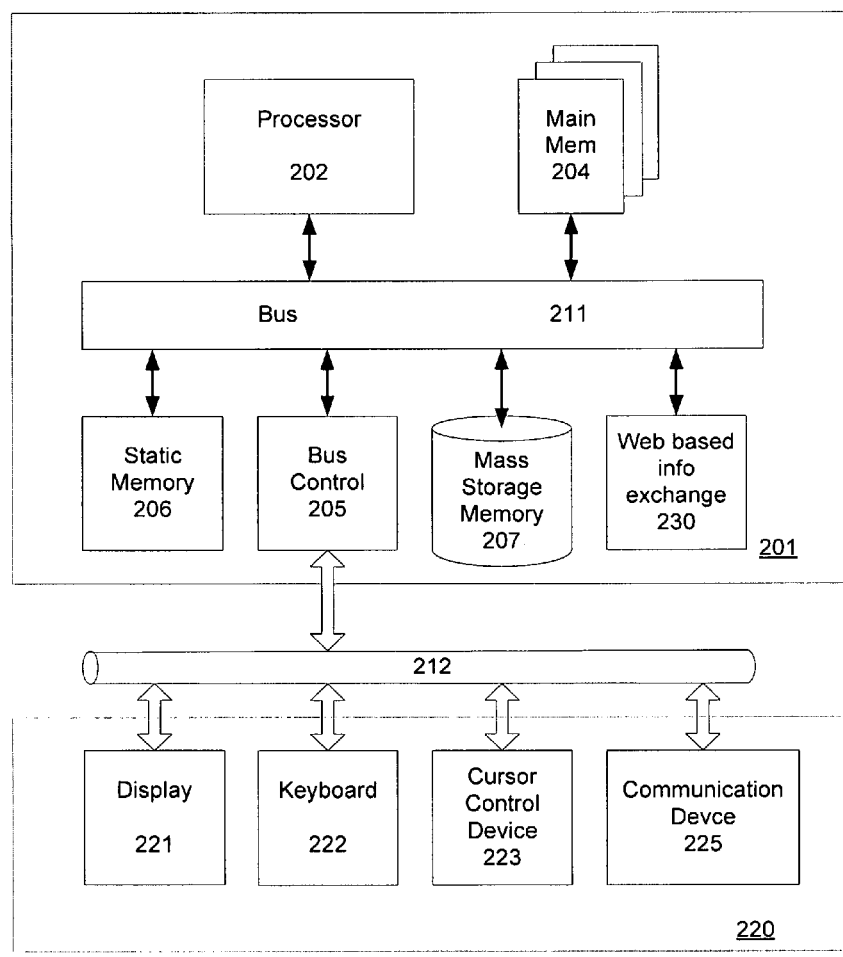
FIG. 12 FIG. 12 has illustrated a embodiment of a computer system and its components.

Having briefly described embodiments of the web based network environment in which the present invention operates, FIG. 12 illustrates an example of a computer system 1200, which is an exemplary of client system 10, provisioned system 3, control system 2, or console system 1 in which the features of the present invention may be implemented. Process of the web based information exchange can be implemented in any processor based computer system, such as a PC, a workstation, or a mainframe computer. It will be apparent to those of ordinary skill in the art that other alternative computer system architectures may also be employed.

Referring back to FIG. 12, computer system 200 includes a processing unit 201, an interface bus 211, and an input/output ("IO") unit 220. Processing unit 201 includes a processor 202, a main memory 204, a system bus 211, a static memory device 206, a bus control unit 205, a mass storage memory 207, and a web information exchange module 230. Bus 211 is used to transmit information between various components and processor 202 for data processing. Processor 202 may be any of a wide variety of general-purpose processors or microprocessors such as Pentium™ microprocessor, Motorola™ 68040, or Power PC™ microprocessor.

Main memory 204, which may include multiple levels of cache memories, stores frequently used data and instructions. Main memory 204 may be RAM (random access memory), MRAM (magnetic RAM), or flash memory. Static memory 206 may be a ROM (read-only memory), which is coupled to bus 211, for storing static information and/or instructions. Bus control unit 205 is coupled to buses 211-212 and controls which component, such as main memory 204 or processor 202, can use the bus. Bus control unit 205 manages the communications between bus 211 and bus 212. Mass storage memory 207, which may be a magnetic disk, an optical disk, hard disk drive, floppy disk, CD-ROM, and/or flash memories for storing large amounts of data. Web based information exchange 230, in one embodiment, is a network control component for facilitating information exchange over the Web described in pretty details in previous paragraphs. It should be noted that web based information exchange 230 could be software or hardware or a combination of software and hardware components.

I/O unit 220, in one embodiment, includes a display 221, keyboard 222, cursor control device 223, and communication device 225. Display device 221 may be a liquid crystal device, cathode ray tube ("CRT"), touch-screen display, or other suitable display device. Display 221 projects or displays images of a graphical planning board. Keyboard 222 may be a conventional alphanumeric input device for communicating information between computer system 200 and computer operator(s). Another type of user input device is cursor control device 223, such as a conventional mouse, touch mouse, trackball, or other type of cursor for communicating information between system 200 and user(s).

Communication device 225 is coupled to bus 211 for accessing information from remote computers or servers, such as server or other computers, through network 11 or 12 as illustrated in FIG. 1. Communication device 225 may include a modem or a network interface device, or other similar devices that facilitate communication between computer 200 and the network. Computer system 200 may be coupled to a number of servers via a network infrastructure such as the infrastructure illustrated in FIG. 1.

The present invention has been described in considerable details with reference to certain examples. However, other versions and examples are also possible, therefore, the spirit of this invention shall not be limited to these examples and/or embodiments. Also, the claims of this invention will label with numbering and in most cases, the numbering does not represent any sequence or order unless specifically described as the steps of a method.

What is claimed is:

1. A method of sharing information comprising:
   establishing, by a server, a per user profile for each of a plurality of users, the profile comprising permissions for the each of the users access to a computing environment comprising available resources including a storage space assigned exclusively to the each of the users,
   the storage space designated for storing information about the available resources including information about files and folders;
   determining, through the profile of the each of the users, permissions whether the each of the users is authorized access to the computing environment, and causing to display, via a web user interface ("UI"), information about the computing environment on an end-user device of the each of the users;
   allowing through the UI of the each of the users displayed to share information including:
      through the UI of a first one of the users, the first one of users
      allowed to select a file from the information displayed and submit a request for posting information of the file to the UI of a second one of the users with whom sharing the file,
      allowed to select the file shared and request deleting the information of the file from the UI of the second one of the users for stop the sharing without physically deleting the file,
      allowed to select a folder from the information displayed and submit a request for posting information of the folder to the UI of the second one of the users for sharing the folder,
      allowed to select the folder shared and request deleting the information of the folder from the UI of the second one of the users for stop the sharing without physically deleting the folder,
      allowed via a message section in the UI to input a message and request posting the message to the UI of the second one of the users for sharing the message, and
      allowed to select the message shared and request deleting the message from the UI of the second one of the users for stop sharing the message.

2. The method as recited in claim 1, wherein the storage space further is configured by the server and comprised of a plurality of sections, at least one of the sections is designated for storing information about files and folders, and another one of the sections designated for storing messages.

3. The method as recited in claim 1, further comprising: the available resources including files and folders residing in each of a plurality of computing devices across a communication network.

4. The method as recited in claim 1, wherein said sharing information comprises:
   causing the server to store the information, but not content, of the file or folder selected into a storage space accessible to the second one of the users when the request for posting the file or folder selected is received.

5. The method as recited in claim 4, further comprising:
   causing to display the stored information of the file or folder in the UI, including to display a corresponding graphic indicator, on the end-user device of the second one of the users and allowing the second one of the users access to the file or folder selected through the stored information of the file or folder displayed.

6. The method as recited in claim 1, wherein said sharing information comprising:
  causing the server to store the message in a storage space accessible to the second one of the users when the request for posting the message is received; and further causing to display the stored message in the UI on the end-user device of the second one of the users.

7. The method as recited in claim 5, further comprising:
  deleting the stored information of the file or folder when the request for stop sharing the file or folder is received from the end-user device of the first one of the users; and
  causing to delete the displayed information of the file or folder from the UI of the second one of the users.

8. A program product comprising:
  a non-transitory computer-readable medium comprising program code that configures the server to:
  establish a per user profile for each of a plurality of users, the profile comprising permissions for the each of the users access to a computing environment comprising available resources including a storage space assigned exclusively to the each of the users,
    the storage space designated for storing information about the available resources including files and folders;
  determine, from the profile of the each of the users, permissions whether the each of the users is authorized access to the computing environment, and causing to display, via a web user interface ("UI"), information about the computing environment on an end-user device of the each of the users;
  allowing through the UI of the each of the users displayed to share information including:
    through the UI of a first one of the users, the first one of the user
    allowed to select a file from the information displayed and request posting information of the file to the UI of a second one of the users with whom sharing the file,
    allowed to select the file shared and request deleting the information of the file from the UI of the second one of the users for stop the sharing without physically deleting the file,
    allowed to select a folder from the information displayed and submit a request for posting information of the folder to the UI of the second one of the users for sharing the folder,
    allowed to select the folder shared and request deleting the information of the folder from the UI of the second one of the users for stop the sharing without physically deleting the folder,
    allowed via a message section in the UI displayed to input a message and request posting the message to the UI of the second one of the users for sharing the message, and
    allowed to select the message shared and request deleting the message from the UI of the second one of the users for stop sharing the message.

9. A server, support information sharing, comprising:
  at least one processor and one network interface,
  the server being configured to:
  establish a per user profile for each of a plurality of users, the profile comprising permissions for the each of the users access to a computing environment, which comprises available resources including a storage space assigned exclusively to the each of the users, the storage space designated for storing information about the available resources including information about files and folders;
  determine, from the profile of the each of the users, permissions whether the each of the users is authorized access to the computing environment, and causing to display, via a web user interface ("UI"), information about the computing environment on an end-user device of the each of the users;
  allowing through the UI of the each of the users displayed to share information including:
    through the UI of a first one of the users, the first one of the users
    allowed to select a file from the information displayed and request posting information of the file to the UI of a second one of the users with whom sharing the file,
    allowed to select the file shared and request deleting the information of the file from the UI of the second one of the users for stop the sharing without physically deleting the file,
    allowed to select a folder from the information displayed and request posting information of the folder to the UI of the second one of the users for sharing the folder,
    allowed to select the folder shared and request deleting the information of the folder from the UI of the second one of the users for stop the sharing without physically deleting the folder,
    allowed via a message section in the UI displayed to input a message and request posting the message to the UI of the second one of the users for sharing the message, and
    allowed to select the message shared and request deleting the message from the UI of the second one of the users for stop sharing the message.

10. The server as recited in claim 9, wherein the storage space further is configured by the server and comprised of a plurality of sections, at least one of the sections of the storage space designated for storing information about files and folders, and another one of the sections designated for storing messages.

11. The server as recited in claim 9, further comprising: the available resources residing among a plurality of computing devices across a network, wherein the server stores collected information about the available resources including information of the files and folders into said storage space.

12. The server as recited in claim 9, further comprises: the available resources residing in the server, wherein the server stores information about the available resources including information about the files and folders in said storage space.

13. The server as recited in claim 9, wherein said sharing information comprises:
  causing the server to store the information, but not content, of the file or folder selected into a storage space accessible to the second one of the users when the request for posting the file or folder is received from the end-user device of the first one of the users.

14. The server as recited in claim 13, further comprises:
  causing display of the stored information of the file or folder, including to display a corresponding graphic indicator, in the UI of the second one of the users and allowing the second one of the users access to the file or folder selected through the stored information of the file or folder displayed.

15. The server as recited in claim 14, further comprises:
  deleting the stored information of the file or folder when the request for stop sharing the file or folder is received from the end-user device of the first one of the users, and causing to delete the displayed information of the file or folder from the UI of the second one of the users.

16. The server as recited in claim 9, wherein said sharing information comprising:
causing the server to store the message in a storage space accessible to the second one of the users when the request for posting the message is received; and further causing display of the stored message in the UI of the second one of the users.

17. The server as recited in claim 16, further comprising:
deleting the stored message when the request for stop sharing the message is received from the end-user device of the first one of the users, and causing to delete the displayed message in the UI of the second one of the users.

18. The server as recited in claim 13, further comprising:
the storage space is exclusively accessible to the second one of the users when the sharing of the file or folder is personal sharing.

19. The server as recited in claim 13, further comprising:
the storage space is exclusively accessible to a group in which the first and second one of the users are members of the group when the sharing of the file or folder is group sharing.

20. The server as recited in claim 19, further comprises:
causing to display the stored information of the file or folder, including to display a corresponding graphic indictor, in the UI of a third one of the users who is also a member in the group, allowing the third one of the users access the file or folder selected.

21. The server as recited in claim 9, further comprises:
allowing the second one of the users sharing files, folders and messages with the first one of the users in person or in group.

22. The method as recited in claim 6, further comprising:
deleting the stored message when the request for stop sharing the message is received from the end-user device of the first one of the users, and causing to delete the displayed message in the UI of the second one of the users.

* * * * *

UNITED STATES PATENT AND TRADEMARK OFFICE
CERTIFICATE OF CORRECTION

PATENT NO. : 8,977,722 B2
APPLICATION NO. : 13/468716
DATED : March 10, 2015
INVENTOR(S) : Sheng Tai Ted Tsao Page 1 of 1

It is certified that error appears in the above-identified patent and that said Letters Patent is hereby corrected as shown below:

In the Claims

In Column 22, Line 24, please replace "share information" with "share information,"

In Column 23 Line 35, please replace "allowing" with "allow"
In Column 23 Line 36, please replace "share information" with "share information,"

In Column 24 Line 11, please replace "allowing" with "allow"
In Column 24 Line 12, please replace "share information" with "share information,"

Signed and Sealed this
Sixth Day of August, 2019

Andrei Iancu
*Director of the United States Patent and Trademark Office*